(12) United States Patent
Zhang et al.

(10) Patent No.: US 11,876,755 B2
(45) Date of Patent: Jan. 16, 2024

(54) ACTIVATION AND PERIODICITY INDICATIONS FOR FULL DUPLEX AND HALF DUPLEX TRANSMISSIONS OF PERIODIC COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/305,981

(22) Filed: Jul. 19, 2021

(65) Prior Publication Data
US 2023/0015915 A1  Jan. 19, 2023

(51) Int. Cl.
*H04W 4/00* (2018.01)
*H04L 5/16* (2006.01)
(Continued)

(52) U.S. Cl.
CPC .............. *H04L 5/16* (2013.01); *H04L 5/1469* (2013.01); *H04W 72/02* (2013.01);
(Continued)

(58) Field of Classification Search
CPC ........ H04L 5/16; H04L 5/1469; H04W 72/23; H04W 72/02; H04W 92/18
See application file for complete search history.

(56) References Cited

U.S. PATENT DOCUMENTS

2013/0083704 A1* 4/2013 Gaal ................. H04L 5/001
370/277
2015/0071062 A1* 3/2015 Cheng ................. H04L 5/14
370/230
(Continued)

FOREIGN PATENT DOCUMENTS

EP          3755045 A1   12/2020
WO    2021066705 A1    4/2021
(Continued)

OTHER PUBLICATIONS

AT&T, et al., "RAN1 UE Features List for Rel-16 NR after RAN1#100-E", 3GPP TSG RAN WG1 #100-e, e-Meeting, R1-2001484, 3rd Generation Partnership Project, Mobile Competence Centre, 650, Route Des Lucioles, F-06921, Sophia-Antipolis Cedex, France, vol. RAN WG1, No. e-meeting, Feb. 24-2020-Mar. 6, 2020, Apr. 10, 2020, XP051873231, pp. 1-237, pp. 176, 177, The section 4, p. 119-123, pp. 88, 145.
(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a wireless communication device may receive a configuration for periodic communications, wherein the configuration indicates a periodicity for the periodic communications. The wireless communication device may receive an indication of whether the periodicity applies to at least one of full duplex resources or half duplex resources. The wireless communication device may communicate based at least in part on the configuration for periodic communications, the periodicity, and the indication. Numerous other aspects are described.

30 Claims, 20 Drawing Sheets

(51) Int. Cl.
*H04W 72/23* (2023.01)
*H04L 5/14* (2006.01)
*H04W 72/02* (2009.01)
*H04W 72/0446* (2023.01)
*H04W 92/18* (2009.01)

(52) U.S. Cl.
CPC ....... *H04W 72/0446* (2013.01); *H04W 72/23* (2023.01); *H04W 92/18* (2013.01)

(56) References Cited

U.S. PATENT DOCUMENTS

| | | | | |
|---|---|---|---|---|
| 2015/0333896 | A1* | 11/2015 | Damnjanovic | H04W 74/0808 370/277 |
| 2019/0357149 | A1* | 11/2019 | Zhang | H04W 72/23 |
| 2020/0313837 | A1* | 10/2020 | Vejlgaard | H04W 76/27 |
| 2021/0076384 | A1* | 3/2021 | MolavianJazi | H04W 74/0833 |
| 2021/0360618 | A1* | 11/2021 | Novlan | H04L 5/14 |
| 2022/0182160 | A1* | 6/2022 | Su | H04L 27/2691 |

FOREIGN PATENT DOCUMENTS

| | | |
|---|---|---|
| WO | 2022067173 | 3/2022 |
| WO | 2022120099 A1 | 6/2022 |

OTHER PUBLICATIONS

Ericsson: "Configured Grants Overlapping with DL Symbols in TDD Operation", 3GPP TSG-RAN WG2 #106, R2-1908014, 3rd Generation Partnership Project, Mobile Competence Centre, 650, Route Des Lucioles, F-06921 Sophia, vol. RAN WG2, No. Reno, USA, May 13, 2019-May 17, 2019, 3 Pages, May 13, 2019, XP051731420, the whole document.

International Search Report and Written Opinion—PCT/US2022/073255—ISA/EPO—dated Sep. 23, 2022.

VIVO: "Discussion on Mode 1 Resource Allocation Mechanism", 3GPP TSG RAN WG1 #98, R1-1908149, 3rd Generation Partnership Project, Mobile Competence Centre, 650, Route Des Lucioles, F-06921 Sophia-Antipolis Cede, vol. RAN WG1, No. Prague, CZ, Aug. 26, 2019-Aug. 30, 2019, Aug. 17, 2019, XP051764768, 15 Pages, pp. 3, 4, 7-9, 11, 14, the whole document.

* cited by examiner

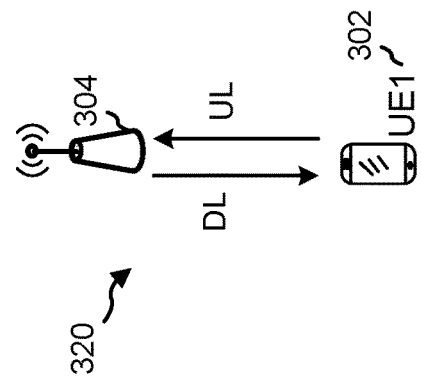
FIG. 3B
FIG. 3C
FIG. 3A

ACTIVATION AND PERIODICITY INDICATIONS FOR FULL DUPLEX AND HALF DUPLEX TRANSMISSIONS OF PERIODIC COMMUNICATIONS

FIELD OF THE DISCLOSURE

Aspects of the present disclosure generally relate to wireless communication and to techniques and apparatuses for activation and periodicity indications for full duplex and half duplex transmissions of periodic communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include receiving a configuration for periodic communications, wherein the configuration indicates a periodicity for the periodic communications. The method may include receiving an indication of whether the periodicity applies to at least one of full duplex resources or half duplex resources. The method may include communicating based at least in part on the configuration for periodic communications, the periodicity, and the indication.

Some aspects described herein relate to a method of wireless communication performed by a wireless communication device. The method may include receiving a single downlink control information (DCI) message that activates multiple periodic communication configurations that include a first periodic communication configuration for full duplex periodic communications and a second periodic communication configuration for half duplex periodic communications. The method may include activating the first periodic communication configuration and the second periodic communication configuration based at least in part on the single DCI message.

Some aspects described herein relate to a method of wireless communication performed by a base station. The method may include transmitting a configuration for periodic communications, wherein the configuration indicates a periodicity for the periodic communications. The method may include transmitting an indication of whether the periodicity applies to at least one of full duplex resources or half duplex resources. The method may include communicating based at least in part on the configuration for periodic communications, the periodicity, and the indication.

Some aspects described herein relate to a method of wireless communication performed by a base station. The method may include transmitting a single DCI message that activates multiple periodic communication configurations that include a first periodic communication configuration for full duplex periodic communications and a second periodic communication configuration for half duplex periodic communications. The method may include activating the first periodic communication configuration and the second periodic communication configuration for a wireless communication device based at least in part on the single DCI message.

Some aspects described herein relate to a wireless communication device for wireless communication. The wireless communication device may include a memory and one or more processors coupled to the memory. The one or more processors may be configured to receive a configuration for periodic communications, wherein the configuration indicates a periodicity for the periodic communications. The one or more processors may be configured to receive an indication of whether the periodicity applies to at least one of full duplex resources or half duplex resources. The one or more processors may be configured to communicate based at least in part on the configuration for periodic communications, the periodicity, and the indication.

Some aspects described herein relate to a wireless communication device for wireless communication. The wireless communication device may include a memory and one or more processors coupled to the memory. The one or more processors may be configured to receive a single DCI message that activates multiple periodic communication configurations that include a first periodic communication configuration for full duplex periodic communications and a second periodic communication configuration for half duplex periodic communications. The one or more processors may be configured to activate the first periodic communication configuration and the second periodic communication configuration based at least in part on the single DCI message.

Some aspects described herein relate to a base station for wireless communication. The base station may include a memory and one or more processors coupled to the memory. The one or more processors may be configured to transmit a configuration for periodic communications, wherein the configuration indicates a periodicity for the periodic communications. The one or more processors may be configured to transmit an indication of whether the periodicity applies to at least one of full duplex resources or half duplex resources. The one or more processors may be configured to communicate based at least in part on the configuration for periodic communications, the periodicity, and the indication.

Some aspects described herein relate to a base station for wireless communication. The base station may include a memory and one or more processors coupled to the memory. The one or more processors may be configured to transmit a single DCI message that activates multiple periodic communication configurations that include a first periodic communication configuration for full duplex periodic communications and a second periodic communication configuration for half duplex periodic communications. The one or more processors may be configured to activate the first periodic communication configuration and the second periodic communication configuration for a wireless communication device based at least in part on the single DCI message.

Some aspects described herein relate to a non-transitory computer-readable medium that stores a set of instructions for wireless communication by a wireless communication device. The set of instructions, when executed by one or more processors of the wireless communication device, may cause the wireless communication device to receive a configuration for periodic communications, wherein the configuration indicates a periodicity for the periodic communications. The set of instructions, when executed by one or more processors of the wireless communication device, may cause the wireless communication device to receive an indication of whether the periodicity applies to at least one of full duplex resources or half duplex resources. The set of instructions, when executed by one or more processors of the wireless communication device, may cause the wireless communication device to communicate based at least in part on the configuration for periodic communications, the periodicity, and the indication.

Some aspects described herein relate to a non-transitory computer-readable medium that stores a set of instructions for wireless communication by a wireless communication device. The set of instructions, when executed by one or more processors of the wireless communication device, may cause the wireless communication device to receive a single DCI message that activates multiple periodic communication configurations that include a first periodic communication configuration for full duplex periodic communications and a second periodic communication configuration for half duplex periodic communications. The set of instructions, when executed by one or more processors of the wireless communication device, may cause the wireless communication device to activate the first periodic communication configuration and the second periodic communication configuration based at least in part on the single DCI message.

Some aspects described herein relate to a non-transitory computer-readable medium that stores a set of instructions for wireless communication by a base station. The set of instructions, when executed by one or more processors of the base station, may cause the base station to transmit a configuration for periodic communications, wherein the configuration indicates a periodicity for the periodic communications. The set of instructions, when executed by one or more processors of the base station, may cause the base station to transmit an indication of whether the periodicity applies to at least one of full duplex resources or half duplex resources. The set of instructions, when executed by one or more processors of the base station, may cause the base station to communicate based at least in part on the configuration for periodic communications, the periodicity, and the indication.

Some aspects described herein relate to a non-transitory computer-readable medium that stores a set of instructions for wireless communication by a base station. The set of instructions, when executed by one or more processors of the base station, may cause the base station to transmit a single DCI message that activates multiple periodic communication configurations that include a first periodic communication configuration for full duplex periodic communications and a second periodic communication configuration for half duplex periodic communications. The set of instructions, when executed by one or more processors of the base station, may cause the base station to activate the first periodic communication configuration and the second periodic communication configuration for a wireless communication device based at least in part on the single DCI message.

Some aspects described herein relate to an apparatus for wireless communication. The apparatus may include means for receiving a configuration for periodic communications, wherein the configuration indicates a periodicity for the periodic communications. The apparatus may include means for receiving an indication of whether the periodicity applies to at least one of full duplex resources or half duplex resources. The apparatus may include means for communicating based at least in part on the configuration for periodic communications, the periodicity, and the indication.

Some aspects described herein relate to an apparatus for wireless communication. The apparatus may include means for receiving a single DCI message that activates multiple periodic communication configurations that include a first periodic communication configuration for full duplex periodic communications and a second periodic communication configuration for half duplex periodic communications. The apparatus may include means for activating the first periodic communication configuration and the second periodic communication configuration based at least in part on the single DCI message.

Some aspects described herein relate to an apparatus for wireless communication. The apparatus may include means for transmitting a configuration for periodic communications, wherein the configuration indicates a periodicity for the periodic communications. The apparatus may include means for transmitting an indication of whether the periodicity applies to at least one of full duplex resources or half duplex resources. The apparatus may include means for communicating based at least in part on the configuration for periodic communications, the periodicity, and the indication.

Some aspects described herein relate to an apparatus for wireless communication. The apparatus may include means for transmitting a single DCI message that activates multiple periodic communication configurations that include a first periodic communication configuration for full duplex periodic communications and a second periodic communication configuration for half duplex periodic communications. The apparatus may include means for activating the first periodic communication configuration and the second periodic communication configuration for a wireless communication device based at least in part on the single DCI message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
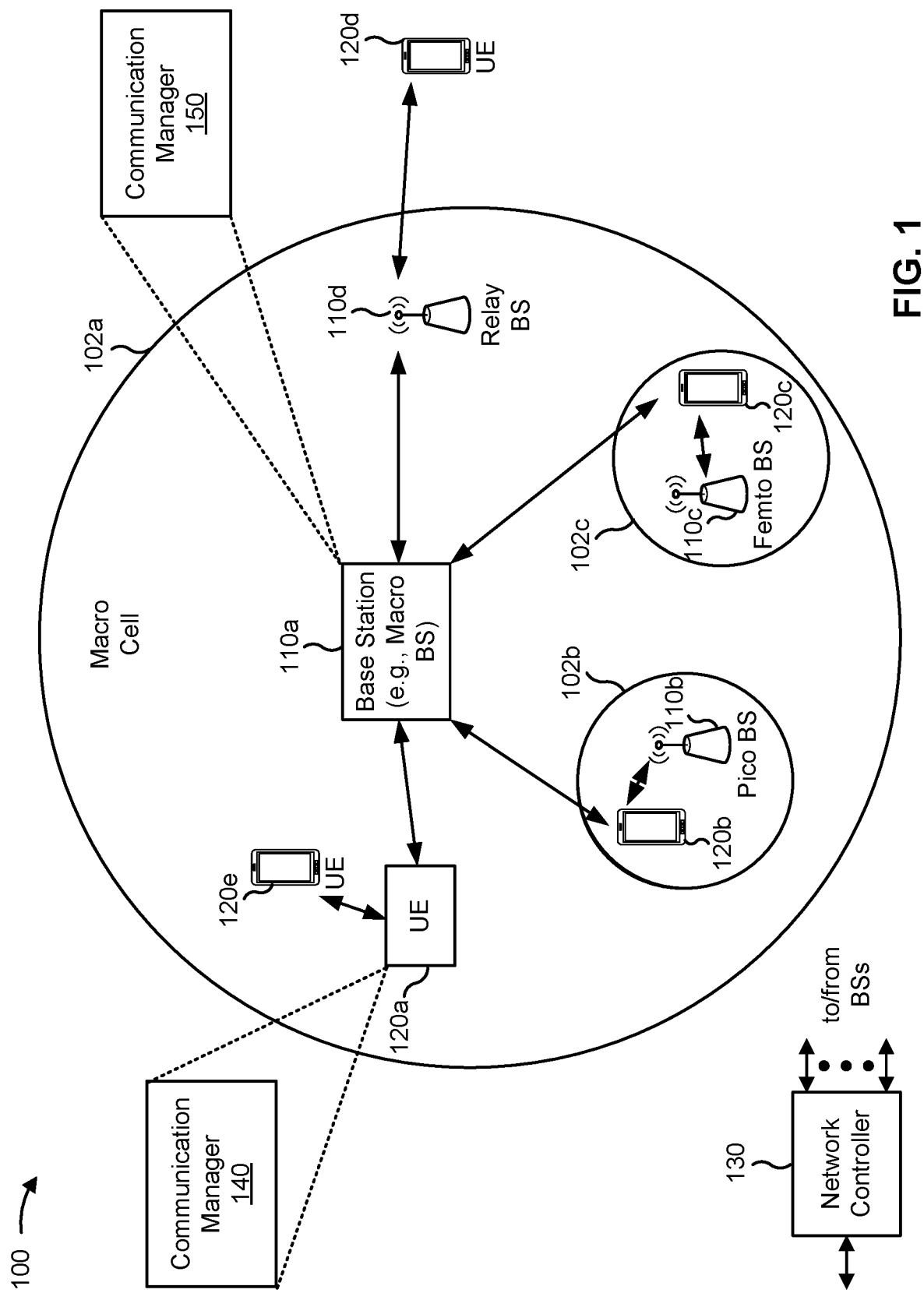
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration for periodic communications, wherein the configuration indicates a periodicity for the periodic communications; receive an indication of whether the periodicity applies to at least one of full duplex resources or half duplex resources; and communicate based at least in part on the configuration for periodic communications, the periodicity, and the indication. Additionally, or alternatively, the communication manager 140 may receive a single downlink control information (DCI) message that activates multiple periodic communication configurations that include a first periodic communication configuration for full duplex periodic periodic communications and a second periodic communication configuration for half duplex periodic communications; and activate the first periodic communication configuration and the second periodic communication configuration based at least in part on the single DCI message. Additionally, or alternatively, the communication manager 140 may perform one or more other operations described herein.

In some aspects, the base station 110 may include a communication manager 150. As described in more detail elsewhere herein, the communication manager 150 may transmit a configuration for periodic communications, wherein the configuration indicates a periodicity for the periodic communications; transmit an indication of whether the periodicity applies to at least one of full duplex resources or half duplex resources; and communicate based at least in part on the configuration for periodic communications, the periodicity, and the indication. Additionally, or alternatively, the communication manager 150 may perform one or more other operations described herein. Additionally, or alternatively, the communication manager 150 may transmit a single DCI message that activates multiple periodic communication configurations that include a first periodic communication configuration for full duplex periodic communications and a second periodic communication configuration for half duplex periodic communications; and activate the first periodic communication configuration and the second periodic communication configuration for a wireless communication device based at least in part on the single DCI message. Additionally, or alternatively, the communication manager 150 may perform one or more other operations described herein.

As indicated above, FIG. 1 is provided as an example. Other examples may differ from what is described with regard to FIG. 1.

Figure 2:
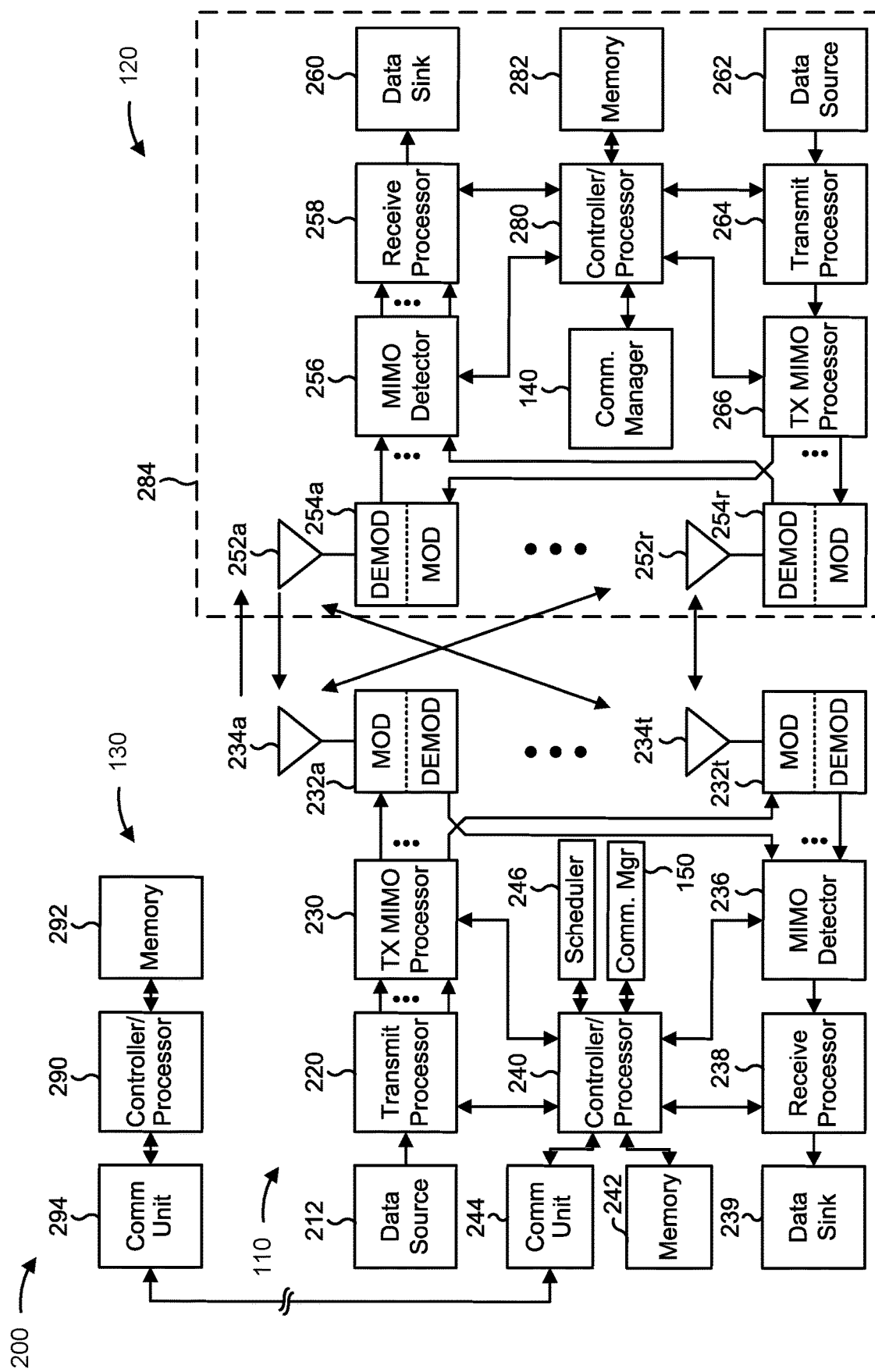
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with activation and/or periodicity indications for full duplex and half duplex transmissions of periodic communications, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE includes means for receiving a configuration for periodic communications, wherein the configuration indicates a periodicity for the periodic communications; means for receiving an indication of whether the periodicity applies to at least one of full duplex resources or half duplex resources; and/or means for communicating based at least in part on the configuration for periodic communications, the periodicity, and the indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a single DCI message that activates multiple periodic communication configurations that include a first periodic communication configuration for full duplex periodic communications and a second periodic communication configuration for half duplex periodic communications; and/or means for activating the first periodic communication configuration and the second periodic communication configuration based at least in part on the single DCI message. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a configuration for periodic communications, wherein the configuration indicates a periodicity for the periodic communications; means for transmitting an indication of whether the periodicity applies to at least one of full duplex resources or half duplex resources; and/or means for communicating based at least in part on the configuration for periodic communications, the periodicity, and the indication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for transmitting a single DCI message that activates multiple periodic communication configurations that include a first periodic communication configuration for full duplex periodic communications and a second periodic communication configuration for half duplex periodic communications; and/or means for activating the first periodic communication configuration and the second periodic communication configuration for a wireless communication device based at least in part on the single DCI message. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication, in accordance with the present disclosure. FD communication may include simultaneous transmission and reception by a single device (e.g., a single UE 120 or a single base station 110). For example, a device may transmit a first communication and receive a second communication at the same time, such as in the same time domain resource (e.g., in the same symbol or in the same slot). FD communications transmitted by a device may overlap completely or partially in time. In some aspects, FD communications may be transmitted and received using the same frequency. Alternatively, FD communications may be transmitted and received using different frequencies. Examples of FD communications include simultaneous uplink (UL) and downlink (DL) communications (e.g., UL transmission and DL reception by a UE 120, or DL transmission and UL reception by a base station 110), simultaneous UL and sidelink (SL) communications (e.g., UL transmission and SL reception by a UE 120), simultaneous DL and SL communications (e.g., SL transmission and DL reception by a UE 120), and simultaneous SL reception and SL transmission (e.g., by a UE 120).

The example 300 of FIG. 3A includes a UE1 302 and two base stations (e.g., TRPs) 304-1, 304-2, where the UE1 302 is using FD to simultaneously transmit an UL transmission to base station 304-1 and receive a DL transmission from the base station 304-2, such as using different antenna panels of the UE1 302. In the example 300 of FIG. 3A, FD is enabled for the UE1 302, but not for the base stations 304-1, 304-2. The example 310 of FIG. 3B includes two UEs, shown as UE1 302-1 and UE2 302-2, and a base station 304, where the base station 304 is using FD to simultaneously transmit a DL transmission to the UE1 302-1 and receive an UL transmission from the UE2 302-2, such as using different antenna panels of the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is using FD to simultaneously receive a DL transmission from the base station 304 and transmit an UL transmission to the base station 304. In the example 320 of FIG. 3C, FD is enabled for both the UE1 302 and the base station 304.

Full duplex communication has various benefits, such as latency reduction, more efficient resource utilization, and more efficient use of the radio frequency spectrum as compared to half duplex communication. However, full duplex communication introduces complexity into device design and coordination of communication between devices as compared to half duplex communication. For example, full duplex communication can result in self-interference (described below) and/or clutter echo. Some techniques and apparatuses described herein assist with the design of periodic communications in a communication system that uses both half duplex and full duplex communication.

As indicated above, FIGS. 3A-3C are provided as examples. Other examples may differ from what is described with regard to FIGS. 3A-3C.

Figure 4A:
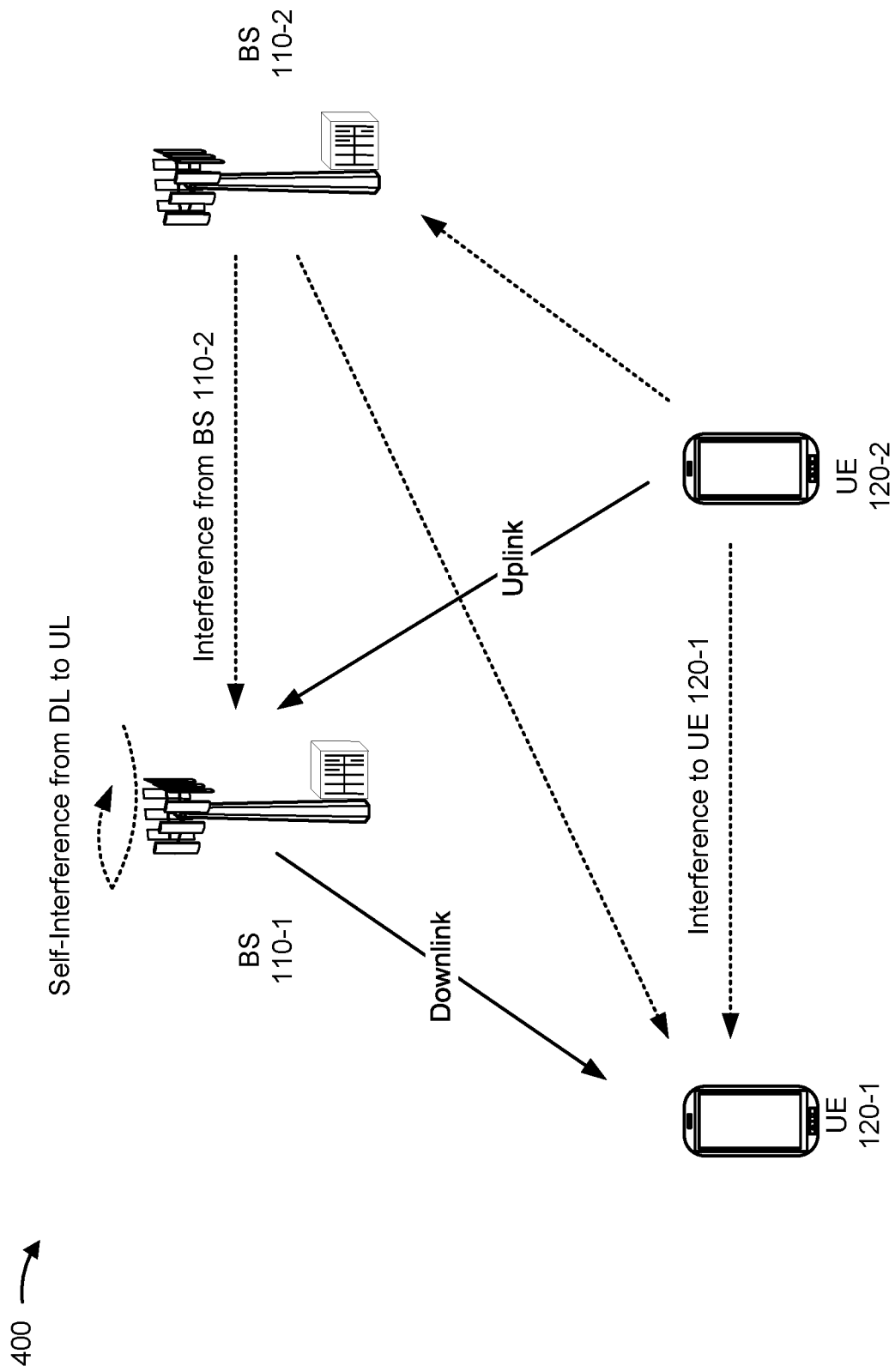
FIGS. 4A-4C are diagrams illustrating examples of interference associated with FD communications, in accordance with the present disclosure.
Figure 4B:
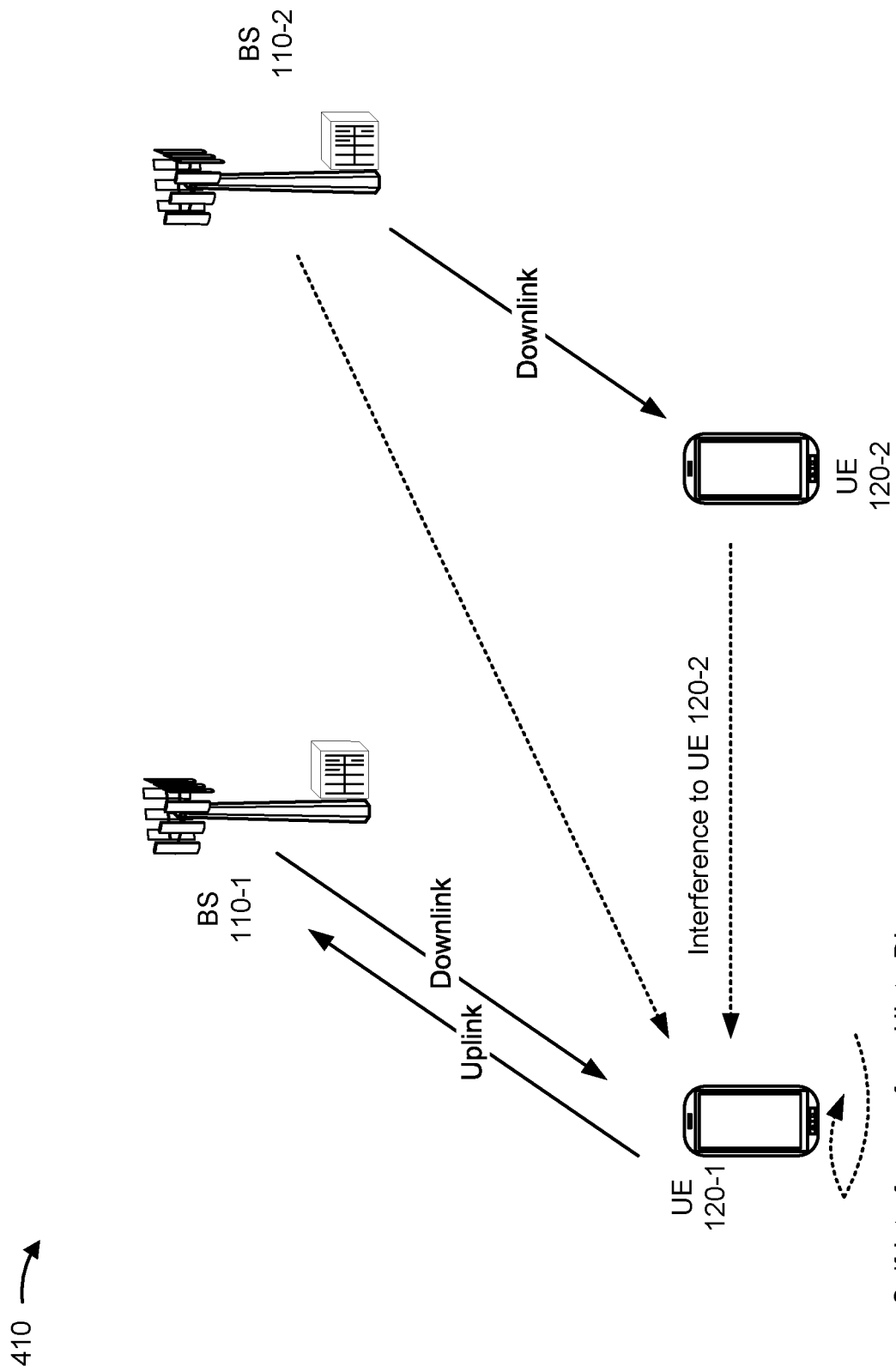
Figure 4C:
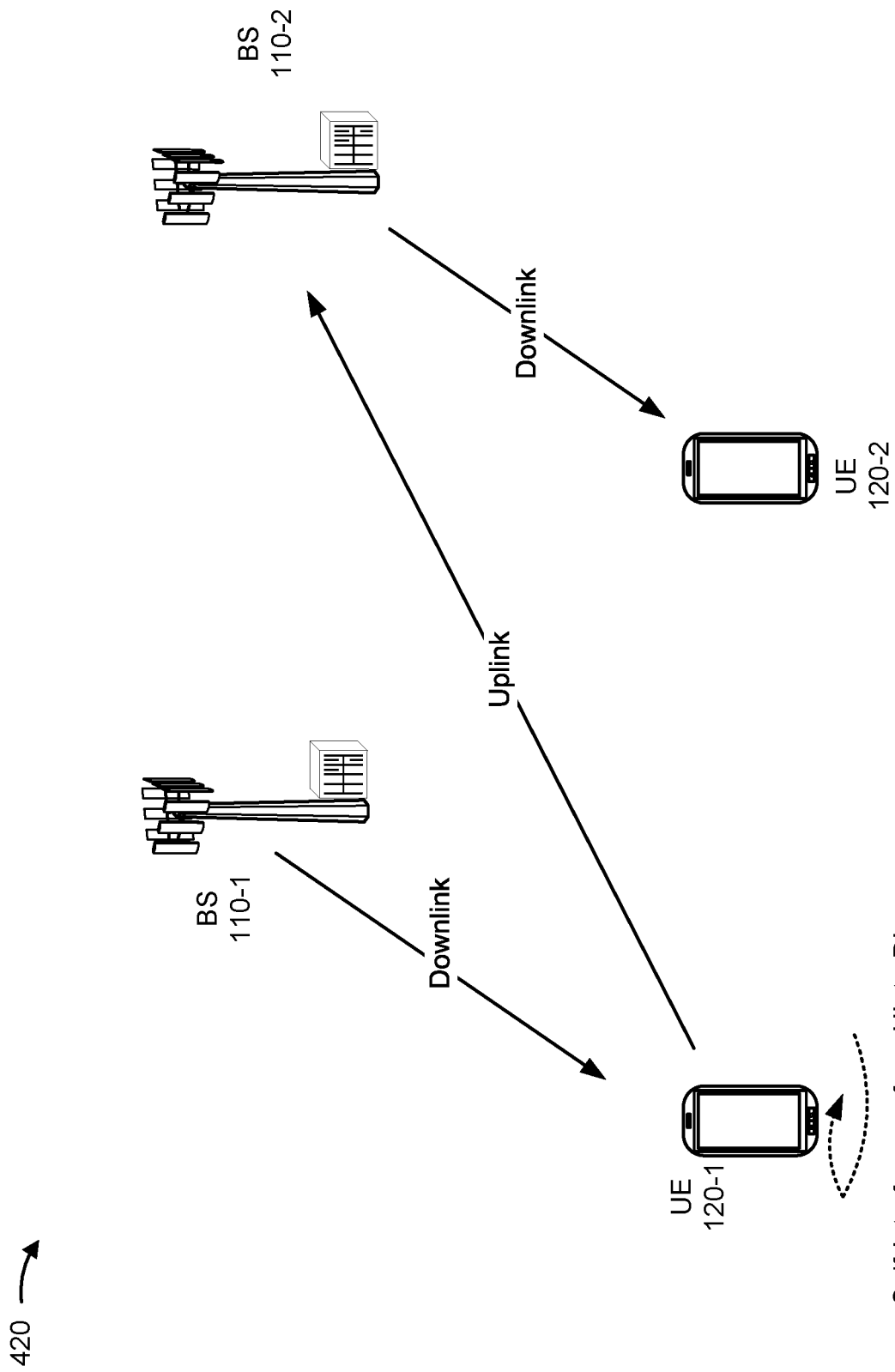

FIGS. 4A-4C are diagrams illustrating examples 400, 410, 420 of interference associated with FD communications, in accordance with the present disclosure. As shown, examples 400, 410, 420 include a BS 110-1, a BS 110-2, a UE 120-1, and a UE 120-2.

As shown in FIG. 4A, the BS 110-1 may use FD communication to simultaneously transmit a DL transmission to the UE 120-1 and receive an UL transmission from the UE 120-2 using the same or different frequency resources and at least partially overlapping in time. In this example, the UE 120-1 may experience interference from the UE 120-2 transmitting an uplink transmission to the BS 110-1. Additionally, or alternatively, the UE 120-1 may experience interference from the BS 110-2 transmitting a downlink transmission to the UE 120-2. Additionally, or alternatively, the BS 110-1 may experience interference from the BS 110-2, which may be transmitting on a downlink to the UE 120-1. Further, the DL transmission from the BS 110-1 to the UE 120-1 may self-interfere with the UL transmission from the UE 120-2 to the BS 110-1. This may be caused by a variety of factors, such as a higher transmit power used for the DL transmission (as compared to the UL transmission) and/or radio frequency bleeding.

As shown in FIG. 4B, in another example, the UE 120-1 may use FD communication to simultaneously transmit an UL transmission to the BS 110-1 and receive a DL transmission from the BS 110-1. In this example, the UE 120-1 may experience interference from the UE 120-2 and/or the BS 110-2 as a result of communication between the BS 110-2 and the UE 120-2. Additionally, or alternatively, the UL transmission from the UE 120-1 to the BS 110-1 may self-interfere with the DL transmission from the BS 110-1 to the UE 120-1. This may be caused by, for example, a higher transmit power for the UL transmission as compared to the DL transmission.

As shown in FIG. 4C, the UE 120-1 may use FD communication to simultaneously receive a DL transmission from the BS 110-1 and transmit an UL transmission to the BS 110-2. In some examples, the BS 110-2 may also transmit a DL transmission to UE 120-2. Thus, in some examples, the BS 110-2 and the UE 120-1 may operate in an FD mode. In this example, the UL transmission from the UE 120-1 to the BS 110-2 may self-interfere with the DL transmission from the BS 110-1 to the UE 120-1. This may be caused by, for example, a higher transmit power for the UL transmission as compared to the DL transmission.

Some techniques and apparatuses described herein assist with the design of periodic communications in a communication system that uses both half duplex and full duplex communication to mitigate complexity introduced by full duplex communication.

As indicated above, FIGS. 4A-4C are provided as examples. Other examples may differ from what is described with respect to FIGS. 4A-4C.

Figure 5:
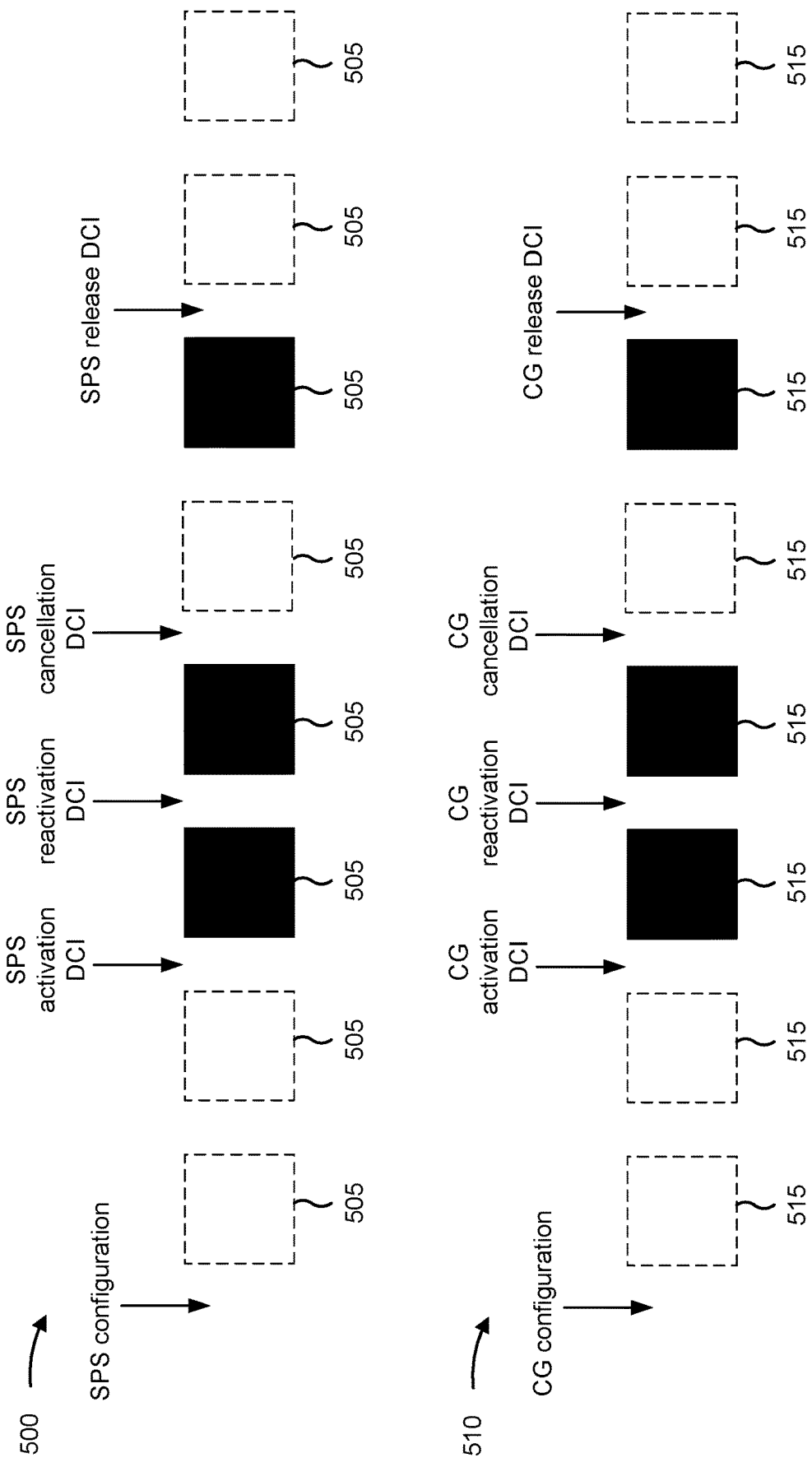
FIG. 5 is a diagram illustrating examples of downlink semi-persistent scheduling (SPS) communication and of uplink configured grant (CG) communication, in accordance with the present disclosure.

FIG. 5 is a diagram illustrating an example 500 of downlink semi-persistent scheduling (SPS) communication and an example 510 of uplink configured grant (CG) communication, in accordance with the present disclosure. SPS communications may include periodic downlink communications that are configured for a UE, such that the base station does not need to send separate DCI to schedule each downlink communication, thereby conserving signaling overhead. CG communications may include periodic uplink communications that are configured for a UE, such that the base station does not need to send separate DCI to schedule each uplink communication, thereby conserving signaling overhead.

As shown in example 500, a UE may be configured with an SPS configuration for SPS communications. For example, the UE may receive the SPS configuration via a radio resource control (RRC) message transmitted by a base station. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 505 for the UE. The SPS configuration may also configure hybrid automatic repeat request (HARQ)-acknowledgement (ACK) (HARQ-ACK) feedback resources for the UE to transmit HARQ-ACK feedback for SPS physical downlink shared channel (PDSCH) communications received in the SPS occasions 505. For example, the SPS configuration may indicate a PDSCH-to-HARQ feedback timing value, which may be referred to as a K1 value in a wireless communication standard (e.g., a 3GPP standard).

The base station may transmit SPS activation DCI to the UE to activate the SPS configuration for the UE. The base station may indicate, in the SPS activation DCI, communication parameters, such as an MCS, a resource block (RB) allocation, and/or antenna ports, for the SPS PDSCH communications to be transmitted in the scheduled SPS occasions 505. The UE may begin monitoring the SPS occasions 505 based at least in part on receiving the SPS activation DCI. For example, beginning with a next scheduled SPS occasion 505 subsequent to receiving the SPS activation DCI, the UE may monitor the scheduled SPS occasions 505 to decode PDSCH communications using the communication parameters indicated in the SPS activation DCI. The UE may refrain from monitoring configured SPS occasions 505 prior to receiving the SPS activation DCI.

The base station may transmit SPS reactivation DCI to the UE to change the communication parameters for the SPS PDSCH communications. Based at least in part on receiving the SPS reactivation DCI, the UE may begin monitoring the scheduled SPS occasions 505 using the communication parameters indicated in the SPS reactivation DCI. For example, beginning with a next scheduled SPS occasion 505 subsequent to receiving the SPS reactivation DCI, the UE may monitor the scheduled SPS occasions 505 to decode PDSCH communications based on the communication parameters indicated in the SPS reactivation DCI.

In some cases, such as when the base station does not have downlink traffic to transmit to the UE, the base station may transmit SPS cancellation DCI to the UE to temporarily cancel or deactivate one or more subsequent SPS occasions 505 for the UE. The SPS cancellation DCI may deactivate only a subsequent one SPS occasion 505 or a subsequent N SPS occasions 505 (where N is an integer). SPS occasions 505 after the one or more (e.g., N) SPS occasions 505 subsequent to the SPS cancellation DCI may remain activated. Based at least in part on receiving the SPS cancellation DCI, the UE may refrain from monitoring the one or more (e.g., N) SPS occasions 505 subsequent to receiving the SPS cancellation DCI. As shown in example 500, the SPS cancellation DCI cancels one subsequent SPS occasion 505 for the UE. After the SPS occasion 505 (or N SPS occasions) subsequent to receiving the SPS cancellation DCI, the UE may automatically resume monitoring the scheduled SPS occasions 505.

The base station may transmit SPS release DCI to the UE to deactivate the SPS configuration for the UE. The UE may stop monitoring the scheduled SPS occasions 505 based at least in part on receiving the SPS release DCI. For example, the UE may refrain from monitoring any scheduled SPS occasions 505 until another SPS activation DCI is received from the base station. Whereas the SPS cancellation DCI may deactivate only a subsequent one SPS occasion 505 or a subsequent N SPS occasions 505, the SPS release DCI deactivates all subsequent SPS occasions 505 for a given SPS configuration for the UE until the given SPS configuration is activated again by a new SPS activation DCI.

As shown in example 510, a UE may be configured with a CG configuration for CG communications. For example, the UE may receive the CG configuration via an RRC message transmitted by a base station. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 515 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The base station may transmit CG activation DCI to the UE to activate the CG configuration for the UE. The base station may indicate, in the CG activation DCI, communication parameters, such as an MCS, an RB allocation, and/or antenna ports, for the CG physical uplink shared channel (PUSCH) communications to be transmitted in the scheduled CG occasions 515. The UE may begin transmitting in the CG occasions 515 based at least in part on receiving the CG activation DCI. For example, beginning with a next scheduled CG occasion 515 subsequent to receiving the CG activation DCI, the UE may transmit a PUSCH communication in the scheduled CG occasions 515 using the communication parameters indicated in the CG activation DCI. The UE may refrain from transmitting in configured CG occasions 515 prior to receiving the CG activation DCI.

The base station may transmit CG reactivation DCI to the UE to change the communication parameters for the CG PUSCH communications. Based at least in part on receiving the CG reactivation DCI, and the UE may begin transmitting in the scheduled CG occasions 515 using the communication parameters indicated in the CG reactivation DCI. For example, beginning with a next scheduled CG occasion 515 subsequent to receiving the CG reactivation DCI, the UE may transmit PUSCH communications in the scheduled CG occasions 515 based at least in part on the communication parameters indicated in the CG reactivation DCI.

In some cases, such as when the base station needs to override a scheduled CG communication for a higher priority communication, the base station may transmit CG cancellation DCI to the UE to temporarily cancel or deactivate one or more subsequent CG occasions 515 for the UE. The CG cancellation DCI may deactivate only a subsequent one CG occasion 515 or a subsequent N CG occasions 515 (where N is an integer). CG occasions 515 after the one or more (e.g., N) CG occasions 515 subsequent to the CG cancellation DCI may remain activated. Based at least in part on receiving the CG cancellation DCI, the UE may refrain from transmitting in the one or more (e.g., N) CG occasions 515 subsequent to receiving the CG cancellation DCI. As shown in example 510, the CG cancellation DCI cancels one subsequent CG occasion 515 for the UE. After the CG occasion 515 (or N CG occasions) subsequent to receiving the CG cancellation DCI, the UE may automatically resume transmission in the scheduled CG occasions 515.

The base station may transmit CG release DCI to the UE to deactivate the CG configuration for the UE. The UE may stop transmitting in the scheduled CG occasions 515 based at least in part on receiving the CG release DCI. For example, the UE may refrain from transmitting in any scheduled CG occasions 515 until another CG activation DCI is received from the base station. Whereas the CG cancellation DCI may deactivate only a subsequent one CG occasion 515 or a subsequent N CG occasions 515, the CG release DCI deactivates all subsequent CG occasions 515 for a given CG configuration for the UE until the given CG configuration is activated again by a new CG activation DCI.

As described above, a configuration for periodic communications (e.g., an SPS configuration or a CG configuration) may indicate a periodicity for the periodic communications, such as a periodicity for SPS communications or a periodicity for CG communications. In some examples, the periodicity may be indicated as a number of slots. However, this may create ambiguity between the UE and the base station as to which slots are configured for periodic communications if some slots are configured for full duplex communication and some other slots are configured for half duplex communication. This ambiguity is further complicated due to different parameters (e.g., beams, MCSs, precoders, rank indications (RIs) for MIMO, transmit powers, timing advance (TA) values, and/or guard bands) used for full duplex communication as compared to half duplex communication.

Some techniques and apparatuses described herein reduce ambiguity between the UE and the base station using an indication of whether a periodic communication configuration (e.g., an SPS configuration or a CG configuration) and/or a periodicity indicated in a periodic communication configuration is to be applied to only full duplex communications, only half duplex communications, or both full duplex and half duplex communications. As a result, the UE and the base station may be aligned with respect to which time domain resources include periodic communications, thereby increasing the likelihood of successful communication and conserving network resources. Furthermore, some techniques and apparatuses described herein conserve signaling overhead by using a single message to activate multiple periodic communication configurations (e.g., SPS configurations and/or CG configurations), such as one or more periodic communication configurations for full duplex and one or more periodic communication configurations for half duplex.

As indicated above, FIG. 5 is provided as an example. Other examples may differ from what is described with respect to FIG. 5.

Figure 6:
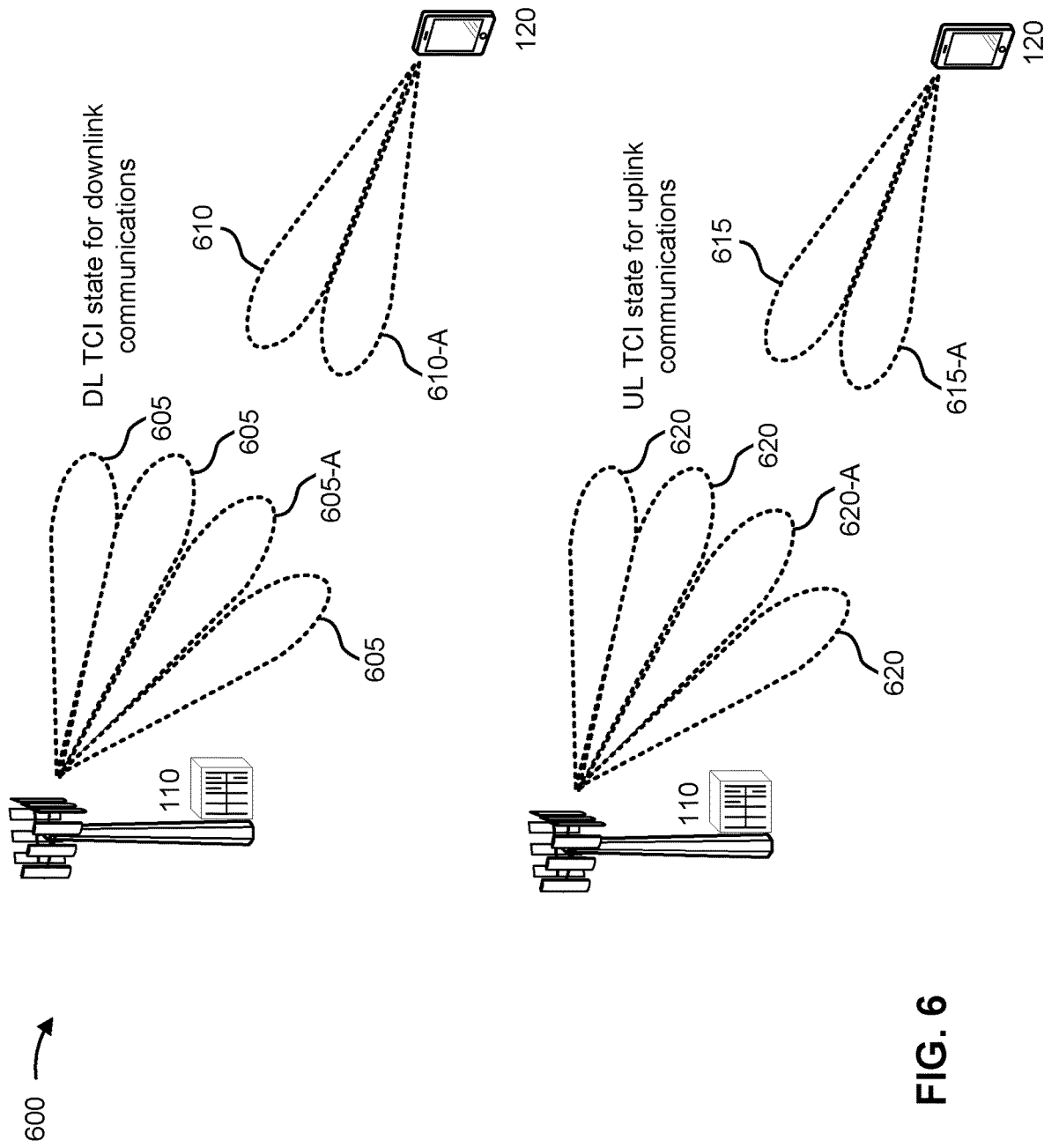
FIG. 6 is a diagram illustrating an example of using beams for communications between a base station and a UE, in accordance with the present disclosure.

FIG. 6 is a diagram illustrating an example 600 of using beams for communications between a base station and a UE, in accordance with the present disclosure. As shown in FIG. 6, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 605.

The UE 120 may attempt to receive downlink transmissions via one or more UE receive beams 610, which may be configured using different beamforming parameters at receive circuitry of the UE 120. The UE 120 may identify a particular BS transmit beam 605, shown as BS transmit beam 605-A, and a particular UE receive beam 610, shown as UE receive beam 610-A, that provide relatively favorable performance (for example, that have a best channel quality of the different measured combinations of BS transmit beams 605 and UE receive beams 610). In some examples, the UE 120 may transmit an indication of which BS transmit beam 605 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 605-A and the UE receive beam 610-A), which may be further refined and maintained in accordance with one or more established beam refinement procedures.

A downlink beam, such as a BS transmit beam 605 or a UE receive beam 610, may be associated with a transmission configuration indication (TCI) state, sometimes referred to as a DL TCI state. A TCI state may indicate a directionality or a characteristic of the downlink beam, such as one or more quasi-colocation (QCL) properties of the downlink beam. A QCL property may include, for example, a Doppler shift, a Doppler spread, an average delay, a delay spread, or a spatial receive parameters, among other examples. In some examples, each BS transmit beam 605 may be associated with a synchronization signal block (SSB), and the UE 120 may indicate a preferred BS transmit beam 605 by transmitting uplink transmissions in resources of the SSB that are associated with the preferred BS transmit beam 605. A particular SSB may have an associated TCI state (for example, for an antenna port or for beamforming). The base station 110 may, in some examples, indicate a downlink BS transmit beam 605 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 610 at the UE 120. Thus, the UE 120 may select a corresponding UE receive beam 610 from a set of BPLs based at least in part on the base station 110 indicating a BS transmit beam 605 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 615.

The base station 110 may receive uplink transmissions via one or more BS receive beams 620. The base station 110 may identify a particular UE transmit beam 615, shown as UE transmit beam 615-A, and a particular BS receive beam 620, shown as BS receive beam 620-A, that provide relatively favorable performance (for example, that have a best channel quality of the different measured combinations of UE transmit beams 615 and BS receive beams 620). In some examples, the base station 110 may transmit an indication of which UE transmit beam 615 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 615-A and the BS receive beam 620-A), which may be further refined and maintained in accordance with one or more established beam refinement procedures. An uplink beam, such as a UE transmit beam 615 or a BS receive beam 620, may be associated with a spatial relation, sometimes referred to as an UL TCI state. A spatial relation may indicate a directionality or a characteristic of the uplink beam, similar to one or more QCL properties, as described above in connection with TCI states.

Some techniques and apparatuses described herein reduce ambiguity between the UE and the base station using an indication of whether a periodic communication configuration (e.g., an SPS configuration or a CG configuration) is to be applied to full duplex communication, half duplex communication, or both. Because there may be different communication parameters, particularly for beamformed communications for full duplex communication as compared to half duplex communication, some techniques and apparatuses reduce ambiguity between a UE and a base station with respect to which communication parameters (e.g., beams or other parameters) for periodic communications are to be used for full duplex communication, and which communication parameters for periodic communications are to be used for half duplex communication. Furthermore, some techniques and apparatuses described herein reduce signaling overhead and latency by enabling activation (and/or deactivation) of multiple periodic communication configurations using a single message, such as a first periodic communication configuration for full duplex periodic communications and a second periodic communication configuration for half duplex periodic communications.

As indicated above, FIG. 6 is provided as an example. Other examples may differ from what is described with respect to FIG. 6.

Figure 7:
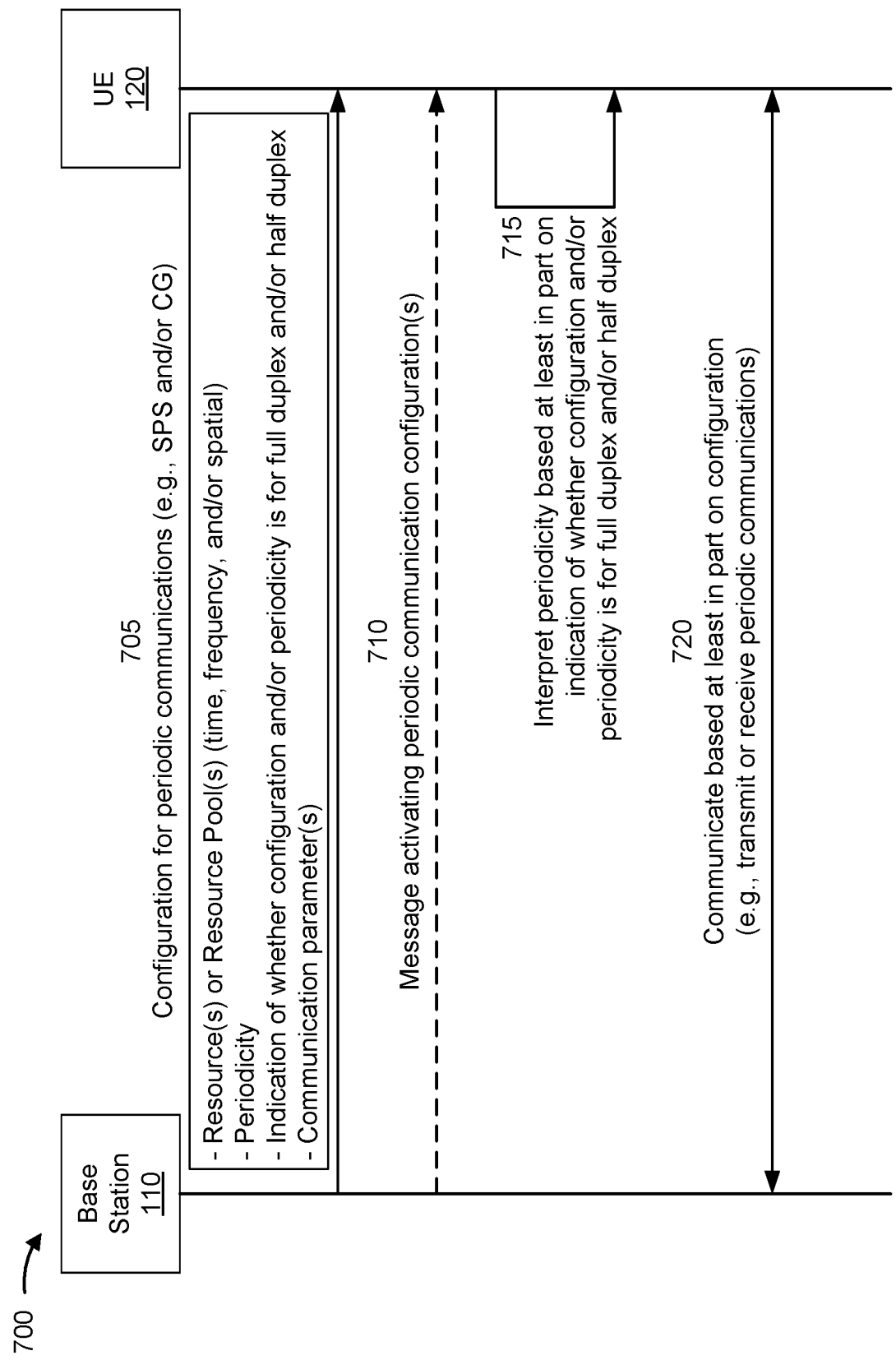
FIGS. 7-10 are diagrams illustrating examples associated with activation and periodicity indications for full duplex and half duplex transmissions of periodic communications, in accordance with the present disclosure.

FIG. 7 is a diagram illustrating an example 700 associated with activation and periodicity indications for full duplex and half duplex transmissions of periodic communications, in accordance with the present disclosure. As shown in FIG. 7, a base station 110 and a UE 120 may communicate with one another. Although aspects are described herein in connection with a UE 120, some aspects may apply to other types of wireless communication devices, such as an integrated access and backhaul (IAB) node.

As shown by reference number 705, the base station 110 may transmit (e.g., using communication manager 150, transmission component 1704, transmission component 1804, and/or controller/processors 240), and the UE 120 may receive (e.g., using communication manager 140, reception component 1502, reception component 1602, and/or controller/processors 280), a configuration for periodic communications (sometimes called a "periodic communication configuration"). The configuration for periodic communications may include, for example, an SPS configuration (e.g., for periodic downlink communications) and/or a CG configuration (e.g., for periodic uplink communications), described in more detail above in connection with FIG. 5. In some aspects, the base station 110 may transmit, and the UE 120 may receive, the configuration in a configuration message, such as an RRC message (e.g., an RRC configuration message or an RRC reconfiguration message). In some aspects, the configuration message may include one or more of an SPS configuration for full duplex communication, a CG configuration for full duplex communication, an SPS configuration for half duplex communication, and/or a CG configuration for half duplex communication. In some aspects, the configuration message may include multiple configurations for periodic communications.

The configuration may identify a resource or a set of resources available to the UE 120 for periodic communications associated with the configuration (e.g., for transmission of an uplink CG communication or reception of a downlink SPS communication). In some aspects, the configuration may indicate a resource allocation for periodic communications configured by (e.g., scheduled by) the configuration. For example, the configuration may identify a resource allocation for a PUSCH (e.g., for CG communications) or for a PDSCH (e.g., for SPS communications). The resource allocation may identify, for example, time domain resources, frequency domain resources, spatial domain resources, and/or code domain resources for the periodic communications. In some aspects, the configuration may identify a resource pool or multiple resource pools available for transmission or reception of the periodic communications.

In some aspects, the configuration may indicate a periodicity for the periodic communications. The periodicity may be associated with the configuration and/or the resource allocation. For example, the resource allocation may indicate one or more time domain resources (e.g., symbols or slots) to be used for a first transmission of a set of periodic communications, and the periodicity may indicate a time period after which those one or more time domain resources are to be used for a second (e.g., subsequent) transmission of the set of periodic communications, and so on. As an example, the periodicity may be indicated as a number of slots or a number of symbols.

In some aspects, the configuration may indicate whether the configuration and/or the periodicity applies to full duplex communication and/or half duplex communication. For example, the configuration may include an indication of whether the periodicity (of the configuration) applies to at least one of full duplex resources or half duplex resources (e.g., only to full duplex resources, only to half duplex resources, or to both full duplex resources and half duplex resources). Although the indication of whether the configuration and/or the periodicity applies to full duplex communication and/or half duplex communication is described herein as being included in the configuration (e.g., a configuration message, such as an RRC message), in some aspects, the indication may be included in a different message (e.g., DCI, such as activation DCI or reactivation DCI) to allow flexible and dynamic modifications.

In some aspects, the configuration message may include an explicit indication (e.g., in a field of the configuration message, using one or more bits) to indicate whether the periodicity applies to full duplex communication and/or half duplex communication. Alternatively, the configuration message may include an implicit indication (e.g., without a dedicated field in the configuration message) to indicate whether the periodicity applies to full duplex communication and/or half duplex communication. For example, some communication parameters may apply to only full duplex communications (e.g., a guard band to be applied between uplink and downlink communications for full duplex communication to mitigate interference, or a beam pair for full duplex communication as opposed to a single receive beam or a single transmit beam for half duplex communication). In some aspects, if a configuration includes or indicates a communication parameter that applies to only full duplex communication (and not to half duplex communication), then this may implicitly indicate that the periodicity for this configuration applies to only full duplex resources. Conversely, if a configuration excludes or does not indicate a communication parameter that applies to only full duplex communication (e.g., does not include a guard band parameter or a beam pair parameter), then this may implicitly indicate that the periodicity for this configuration applies to only half duplex resources.

In some aspects, there may be only two options to which the periodicity can be applied. For example, the periodicity may be applied to only full duplex resources or to only half duplex resources (and not to both full duplex resources and half duplex resources). In this example, the indication may indicate whether the periodicity applies only to full duplex resources or only to half duplex resources. For example, the explicit indication described above may be a single bit, with a first value of the bit (e.g., 1) indicating that the periodicity is to be applied to only full duplex resources, and a second value of the bit (e.g., 0) indicating that the periodicity is to be applied to only half duplex resources. As another example, the implicit indication may be indicated based at least in part on the communication parameters for the configuration, as described above.

Alternatively, there may be three options to which the periodicity can be applied. For example, the periodicity may be applied to only full duplex resources, to only half duplex resources, or to both full duplex resources and half duplex resources. In this example, the indication may indicate whether the periodicity applies only to full duplex resources, only to half duplex resources, or to both full duplex resources and half duplex resources. For example, the explicit indication described above may be two bits, with a first value of the two bits (e.g., 10) indicating that the periodicity is to be applied to only full duplex resources, a second value of the two bits (e.g., 01) indicating that the periodicity is to be applied to only half duplex resources, and a third value of the two bits (e.g., 11) indicating that the periodicity is to be applied to both full duplex resources and half duplex resources. As another example, the indication may include a combination of an implicit indication and an explicit indication (e.g., that is a single bit). For example, if the configuration includes or indicates a communication parameter that applies to only full duplex communication (and not to half duplex communication), then a first bit value (e.g., 0) of an explicit indication included in the configuration may indicate that the periodicity applies to only full duplex resources, and a second bit value (e.g., 1) of the explicit indication may indicate that the periodicity applies to both full duplex resources and half duplex resources. As another example, if the configuration excludes or does not indicate a communication parameter that applies to only full duplex communication, then a first bit value (e.g., 0) of an explicit indication included in the configuration may indicate that the periodicity applies to only half duplex resources, and a second bit value (e.g., 1) of the explicit indication may indicate that the periodicity applies to both full duplex resources and half duplex resources. These indications are provided as examples, and other examples may differ from what is described herein.

In some aspects, the configuration may indicate a set of communication parameters for periodic communications. A communication parameter may include, for example, a beam to be used for periodic communications, a beam pair to be used for periodic communications, an MCS to be used for periodic communications, a precoder to be used for periodic communications, an RI to be used for periodic communications, a transmit power to be used for periodic communications, and/or a guard band to be used for periodic communications. One or more of the communication parameters may apply to only downlink or SPS communications, and one or more of the communication parameters may apply to only uplink or CG communications. For example, a transmit power may apply to only CG communications. Furthermore, one or more of the communication parameters may apply to only full duplex communications, and one or more of the communication parameters may apply to only half duplex communications. For example, a beam (e.g., only a transmit beam for CG communications or only a receive beam for SPS communications) may be indicated for a configuration for half duplex periodic communications, whereas a beam pair (e.g., a transmit beam and a receive beam) may be indicated for one or more configurations for full duplex periodic communications. As another example, a guard band may be indicated for one or more configurations for full duplex periodic communications to indicate a separation (e.g., in the frequency domain) between uplink or CG communications and downlink or SPS communications.

As shown by reference number 710, the base station 110 may transmit (e.g., using communication manager 150, transmission component 1704, transmission component 1804, and/or controller/processors 240), and the UE 120 may receive (e.g., using communication manager 140, reception component 1502, reception component 1602, and/or controller/processors 280), a message activating one or more periodic communication configurations. For example, the base station 110 may transmit a periodic communication activation message, such as a periodic communication activation DCI, to the UE 120. The periodic communication activation message may include, for example, SPS activation DCI and/or CG activation DCI, as described above in connection with FIG. 5. In some aspects, the base station 110 may not transmit activation DCI for an initial activation for a periodic communication configuration (as indicated by the dashed line in connection with reference number 710), such as when the configuration message (e.g., an RRC message) initially activates the periodic communication configuration. However, if the base station 110 deactivates a periodic communication configuration, the base station 110 may later transmit activation DCI to reactivate the periodic communication configuration.

In some aspects, the base station 110 may transmit, and the UE 120 may receive, separate messages for activation of full duplex periodic communications and activation of half duplex periodic communications. For example, the base station 110 may transmit a first message (e.g., a first DCI message, a first activation DCI) to activate periodic communications in full duplex resources and a second message (e.g., a second DCI message, a second activation DCI) to activate periodic communications in half duplex resources. Further details are described in connection with FIG. 9. This may reduce complexity of the DCI as compared to transmitting a single DCI message for activation of both full duplex periodic communications and half duplex periodic communications.

Alternatively, the base station 110 may transmit, and the UE 120 may receive, a single message for activation of full duplex periodic communications and activation of half duplex periodic communications. For example, the base station 110 may transmit a single message (e.g., a single DCI message, a single activation DCI) to activate periodic communications in full duplex resources and to activate periodic communications in half duplex resources. Further details are described in connection with FIGS. 8 and 10. This may reduce signaling overhead as compared to transmitting multiple activation messages.

As shown by reference number 715, the UE 120 may interpret (e.g., using communication manager 140, interpretation component 1508, and/or controller/processor 280) the periodicity, indicated in the configuration, based at least in part on the indication of whether the configuration and/or the periodicity is for full duplex communication and/or half duplex communication. The UE 120 may use this interpretation to determine a manner in which to count resources (e.g., time domain resources, such as slots or symbols) toward a count associated with the periodicity. For example, to communicate using periodic communications, the UE 120 may store, in memory, a counter value that is incremented until a threshold value, such as the indicated periodicity, is reached. The UE 120 may then transmit or receive a periodic communication. As an example using CG and a periodicity of 5 slots, the UE 120 may transmit a CG communication in a slot and reset a counter value. Then, for each slot (e.g., each full duplex slot, each half duplex slot, or for both half duplex and full duplex slots, depending on the indication), the UE 120 may increment the counter value until the counter value is equal to the periodicity, and then the UE 120 may transmit another CG communication. Whether or not the UE 120 counts a particular slot toward the periodicity (e.g., whether or not the UE 120 increments the counter value) depends on the indication of whether the periodicity applies to full duplex slots and/or half duplex slots.

For example, if the indication indicates that the periodicity is to be applied to only full duplex resources, then the UE 120 may count only full duplex resources (e.g., full duplex slots or full duplex symbols), and not half duplex resources, toward the periodicity. In this example, if the periodicity indicates 10 slots, then the UE 120 may count only full duplex slots (and not half duplex slots) toward the periodicity to identify a next occasion for a periodic communication configured with that periodicity. Similarly, if the indication indicates that the periodicity is to be applied to only half duplex resources, then the UE 120 may count only half duplex resources (e.g., half duplex slots or half duplex symbols), and not full duplex resources, toward the periodicity. In this example, if the periodicity indicates 10 slots, then the UE 120 may count only half duplex slots (and not full duplex slots) toward the periodicity to identify a next occasion for a periodic communication configured with that periodicity. If the indication indicates that the periodicity is to be applied to both half duplex resources and full duplex resources, then the UE 120 may count both half duplex resources (e.g., half duplex slots or half duplex symbols) and full duplex resources (e.g., full duplex slots of full duplex symbols), toward the periodicity. In this example, if the periodicity indicates 10 slots, then the UE 120 may count all slots (e.g., both half duplex slots and full duplex slots) toward the periodicity to identify a next occasion for a periodic communication configured with that periodicity. The base station 110 may operate in a similar manner to interpret and/or count toward the periodicity (e.g., using communication manager 150, interpretation component 1708, and/or controller/processor 240).

In some aspects, the UE 120 may use an indication of a slot format (e.g., a slot format indicator (SFI)) to identify whether a slot is a half duplex slot or a full duplex slot. For example, the base station 110 may configure (e.g., using an RRC message) or otherwise indicate (e.g., using DCI), to the UE 120, a time domain resource allocation and/or a time-division duplexing (TDD) pattern that indicates a slot format for each slot in a set of slots. A particular slot, in the set of slots, may be configured as an uplink (U) slot, a downlink (D) slot, a flexible (F) slot, or a full duplex (FD) slot. In this example, a configuration of a slot as an uplink slot, a downlink slot, or a flexible slot indicates that the slot is a half duplex slot, whereas a configuration of a slot as a full duplex slot indicates that the slot is a full duplex slot. In some aspects, the SFI may be used to identify full duplex resources and half duplex resources, for interpreting the periodicity, for access link communications between the base station 110 and the UE 120.

Additionally, or alternatively, the UE 120 may use one or more resource pools (e.g., multiple resource pools, such as multiple sidelink resource pools, in some aspects) to identify whether a slot is a half duplex slot or a full duplex slot. For example, the base station 110 may configure (e.g., using an RRC message) a first resource pool (e.g., a first sidelink resource pool) for half duplex communications (e.g., a half duplex resource pool) and a second resource pool (e.g., a second sidelink resource pool) for full duplex communications (e.g., a full duplex resource pool). In this example, the first resource pool includes only half duplex resources, and the second resource pool includes only full duplex resources. In some aspects, the base station 110 may configure these resource pools for sidelink communication (e.g., between two UEs 120 rather than between the base station 110 and a UE 120). In some aspects, the base station 110 may configure these resource pools per UE 120 or per UE group (e.g., a group of UEs 120). The base station 110 may identify full duplex resources and half duplex resources, for interpreting the periodicity, in a similar manner (e.g., using an SFI configuration and/or a resource pool configuration).

As shown by reference number 720, the UE 120 (e.g., using communication manager 140, reception component 1502, reception component 1602, transmission component 1504, transmission component 1604, and/or controller/processor 280) and the base station 110 (e.g., using communication manager 150, reception component 1702, reception component 1802, transmission component 1704, transmission component 1804, and/or controller/processor 240) may communicate based at least in part on the configuration for periodic communications (e.g., including the periodicity) and the indication of whether the configuration and/or the periodicity applies to full duplex resources and/or half duplex resources. For example, the base station 110 and/or the UE 120 may interpret the periodicity according to the indication (e.g., by counting or not counting half duplex resources and/or full duplex resources toward the periodicity based at least in part on the indication) and may communicate according to the interpreted periodicity, as described above. The UE 120 and/or the base station 110 may use this interpretation to identify resources (e.g., slots and/or symbols) for transmission or reception of periodic communications, such as for transmission of CG communications by the UE 120 and reception of CG communications by the base station 110, or for transmission of SPS communications by the base station 110 and reception of SPS communications by the UE 120.

By indicating whether a periodic communication configuration and/or a periodicity of the periodic communication configuration applies to full duplex periodic communications and/or half duplex periodic communications, some techniques and apparatuses described herein reduce ambiguity between the UE 120 and the base station 110. This may increase a likelihood of successful communication between the UE 120 and the base station 110. Furthermore, this may conserve network resources by reducing a number of retransmissions that would otherwise be used to retransmit failed communications (e.g., if the UE 120 and the base station 110 have different interpretations of whether the periodicity applies to full duplex resources, half duplex resources, or both).

As indicated above, FIG. 7 is provided as an example. Other examples may differ from what is described with respect to FIG. 7.

Figure 8:
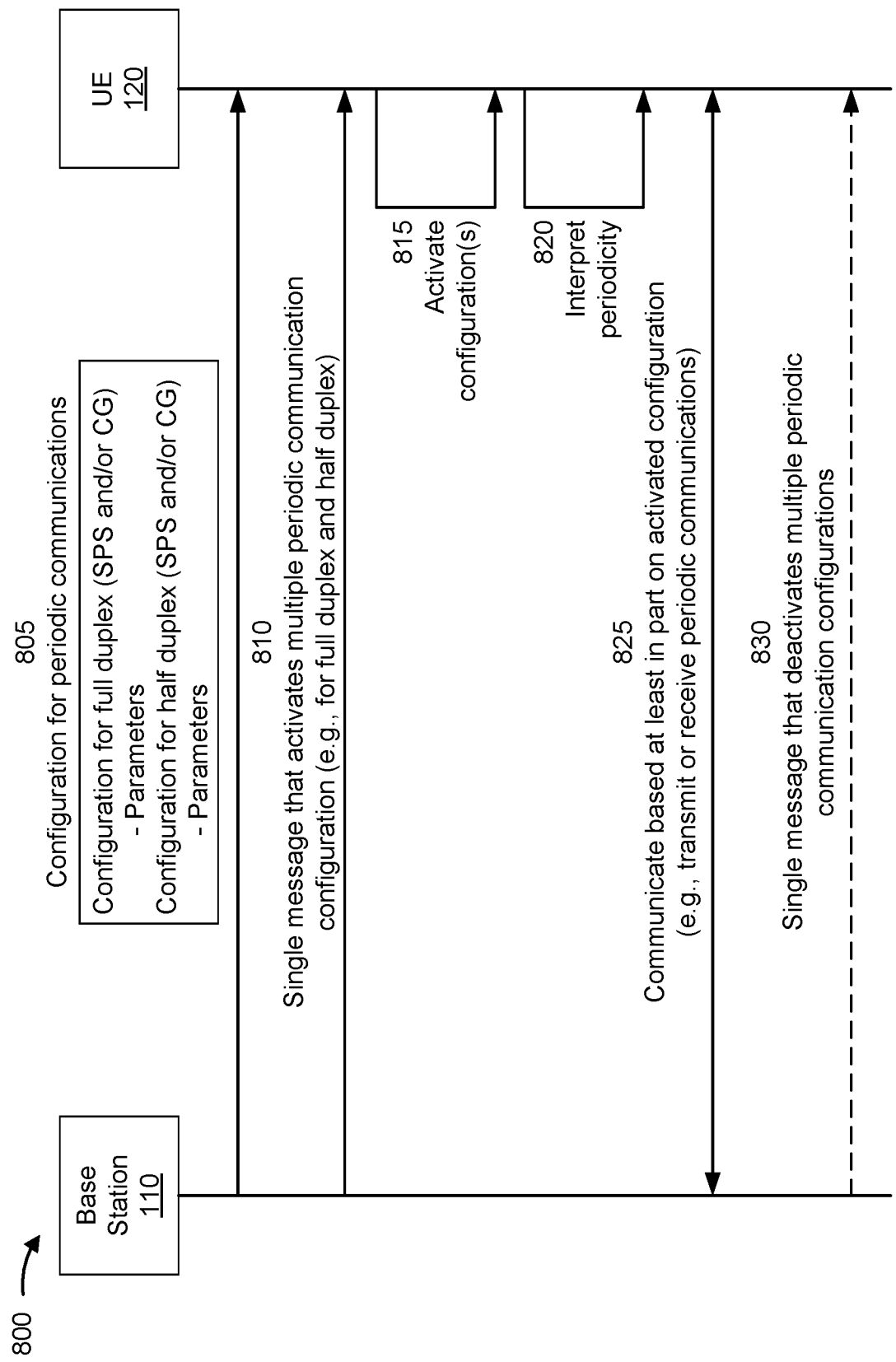

FIG. 8 is a diagram illustrating an example 800 associated with activation and periodicity indications for full duplex and half duplex transmissions of periodic communications, in accordance with the present disclosure. As shown in FIG. 8, a base station 110 and a UE 120 may communicate with one another. Although aspects are descried herein in connection with a UE 120, some aspects may apply to other types of wireless communication devices, such as an IAB node.

As shown by reference number 805, the base station 110 may transmit (e.g., using communication manager 150, transmission component 1704, transmission component 1804, and/or controller/processors 240), and the UE 120 may receive (e.g., using communication manager 140, reception component 1502, reception component 1602, and/or controller/processors 280), a configuration for periodic communications, as described above in connection with FIG. 7. In example 800, the base station 110 configures, for the UE 120, a first periodic communication configuration for full duplex periodic communications (e.g., a full duplex periodic communication configuration) and a second periodic communication configuration for half duplex periodic communications (e.g., a half duplex periodic communication configuration). The configurations may each indicate corresponding resources, corresponding periodicities, corresponding indications of whether the configuration and/or the periodicity applies to full duplex resources and/or half duplex resources, and/or corresponding communication parameters, as described above in connection with FIG. 7.

As shown by reference number 810, the base station 110 may transmit (e.g., using communication manager 150, transmission component 1704, transmission component 1804, and/or controller/processors 240), and the UE 120 may receive (e.g., using communication manager 140, reception component 1502, reception component 1602, and/or controller/processors 280), a single message that activates multiple periodic communication configurations. The multiple periodic communication configurations may include a first periodic communication configuration for full duplex periodic communications and a second periodic communication configuration for half duplex periodic communications. For example, the single message may activate an SPS full duplex configuration, a CG full duplex configuration, and one or both of an SPS half duplex configuration or a CG half duplex configuration. In some aspects, the single message is a single DCI message, such as a single activation DCI message (described in connection with FIG. 5). By using a single message for multiple activations, signaling overhead and processing overhead may be reduced as compared to using separate messages, thereby conserving network resources and processing resources.

In some aspects, the single message may indicate a first set of (e.g., one or more) TCI states for full duplex periodic communications and a second set of (e.g., one or more) TCI states for half duplex periodic communications. As described in connection with FIG. 6, "TCI state" broadly refers to a beam configuration for downlink communications (sometimes called a "downlink TCI state") or for uplink communications (sometimes called an "uplink TCI state" or a "spatial relation"). In some aspects, the single message may indicate one or more TCI states for full duplex downlink communications, one or more TCI states for full duplex uplink communications, one or more TCI states for half duplex downlink communications, and/or one or more TCI states for half duplex uplink communications. In some aspects, the downlink TCI states for full duplex communications may be different from the downlink TCI states for half duplex communications. Similarly, the uplink TCI states for full duplex communications may be different from the uplink TCI states for half duplex communications. This may be because the best beam for half duplex communication may not be the best beam for full duplex communications due to self-interference or other communication complexities associated with full duplex communication.

In some aspects, the single message may include two separate values (e.g., two separate codepoints), which may be indicated in two separate fields, to indicate the first set of TCI states for full duplex periodic communications and the second set of TCI states for half duplex periodic communications. For example, a first value (e.g., in a first field) in the single message may indicate the first set of TCI states (e.g., which may include uplink TCI states and/or downlink TCI states for full duplex communication), and a second value (e.g., in a second field) in the single message may indicate the second set of TCI states. In some aspects, the first value is associated with and/or indicates a downlink reference signal and an uplink reference signal for full duplex communication. In some aspects, second value is associated with and/or indicates a reference signal for half duplex communication. This may provide increased flexibility in signaling TCI states. Alternatively, the single message may include a single value (e.g., a single codepoint), which may be indicated in a single field, to indicate the first set of TCI states and the second set of TCI states. For example, a single value (e.g., in a single field) in the single message may map to the first set of TCI states and the second set of TCI states. In some aspects, the single value may map to a reference signal for half duplex communication, as well as a downlink reference signal and an uplink reference signal for full duplex communication. This may reduce signaling overhead.

A value included in the single message may map to one or more sets of TCI states. For example, a value of 0 may map to a first TCI state (or TCI states), a value of 1 may map to a second TCI state (or TCI states), and so on. As another example, a value of 0 may map to a first full duplex TCI state (or TCI states) and a first half duplex TCI state (or TCI states), a value of 1 may map to a second full duplex TCI state (or TCI states) and a second half duplex TCI state (or TCI states), and so on. In some aspects, the base station 110 may indicate the mapping between a set of values and a corresponding one or more TCI states to the UE 120. For example, the base station 110 may indicate the mapping to the UE 120 in a configuration message, in DCI, and/or in a medium access control (MAC) control element (CE) (MAC-CE).

As shown by reference number 815, the UE 120 may activate (e.g., using communication manager 140, activation component 1608, and/or controller/processor 280) the multiple periodic communication configurations indicated in the single message. For example, the UE 120 (and the base station 110) may activate the first periodic communication configuration for full duplex periodic communications and the second periodic communication configuration for half duplex periodic communications. In some aspects, the UE 120 (and the base station 110) may activate an SPS full duplex configuration, a CG full duplex configuration, and one or both of an SPS half duplex configuration or a CG half duplex configuration. Activation of SPS configurations and CG configurations are described in more detail in connection with FIG. 5. The base setation 110 may also activate (e.g., using communication manager 150, activation component 1808, and/or controller/processor 240) the multiple periodic communication configurations indicated in the single message.

As shown by reference number 820, the UE 120 may interpret (e.g., using communication manager 140, interpretation component 1508, and/or controller/processor 280) the periodicities, indicated in the configurations, based at least in part on corresponding indications of whether the configurations and/or the periodicities are for full duplex communication and/or half duplex communication, in a similar manner as described above in connection with reference number 715 of FIG. 7. The UE 120 may do this interpretation for each periodic communication configuration indicated in the configuration message. For example, the UE 120 may determine, for each full duplex periodic communication configuration, whether a periodicity indicated for the full duplex periodic communication configuration applies to only full duplex resources or applies to both full duplex resources and half duplex resources. As another example, the UE 120 may determine, for each half duplex periodic communication configuration, whether a periodicity indicated for the half duplex periodic communication configuration applies to only half duplex resources or applies to both full duplex resources and half duplex resources. The base station 110 may operate in a similar manner to interpret the periodicities (e.g., using communication manager 150, interpretation component 1708, and/or controller/processor 240).

As shown by reference number 825, the UE 120 (e.g., using communication manager 140, reception component 1502, reception component 1602, transmission component 1504, transmission component 1604, and/or controller/processor 280) and the base station 110 (e.g., using communication manager 150, reception component 1702, reception component 1802, transmission component 1704, transmission component 1804, and/or controller/processor 240) may communicate based at least in part on the configurations for periodic communications (e.g., including the periodicities) and the indications of whether the configurations and/or the periodicities apply to full duplex resources and/or half duplex resources, in a similar manner as described above in connection with reference number 720 of FIG. 7. The UE 120 and the base station 110 may perform this communication for each periodic communication configuration indicated in the configuration message. For example, the UE 120 may communicate with the base station 110 in a full duplex mode according to one or more full duplex periodic communications configuration indicated in the configuration message. Similarly, the UE 120 may communicate with the base station 110 in a half duplex mode according to one or more half duplex periodic communication configurations indicated in the configuration message. Additional details of periodic communication configuration are described above in connection with FIG. 5.

As shown by reference number 830, the base station 110 may transmit (e.g., using communication manager 150, transmission component 1704, transmission component 1804, and/or controller/processors 240), and the UE 120 may receive (e.g., using communication manager 140, reception component 1502, reception component 1602, and/or controller/processors 280), a single message that deactivates multiple periodic communication configurations. In some aspects, the single message is a single DCI message, such as a single release DCI message (described in connection with FIG. 5). By using a single message for multiple deactivations, signaling overhead and processing overhead may be reduced as compared to using separate messages, thereby conserving network resources and processing resources. However, in some aspects, the base station 110 may deactivate fewer than all of the periodic communication configurations that are active. In this case, the base station 110 may, in some aspects, transmit a message that deactivates a single periodic communication configuration that is active (and thus may not deactivate multiple periodic communication configurations in a single message, as indicated by the dashed line in FIG. 8). Alternatively, the single message may deactivate multiple periodic communication configurations that are a subset of the periodic communication configurations that are active (e.g., that are activated by the single message described in connection with reference number 810 and/or that are activated by one or more other messages). Thus, the base station 110 may transmit a message to deactivate all or a subset of the active periodic communication configurations.

By using a single message to activate and/or deactivate multiple periodic communication configurations, some techniques and apparatuses described herein reduce signaling overhead and reduce latency as compared to using separate messages.

As indicated above, FIG. 8 is provided as an example. Other examples may differ from what is described with respect to FIG. 8.

Figure 9:
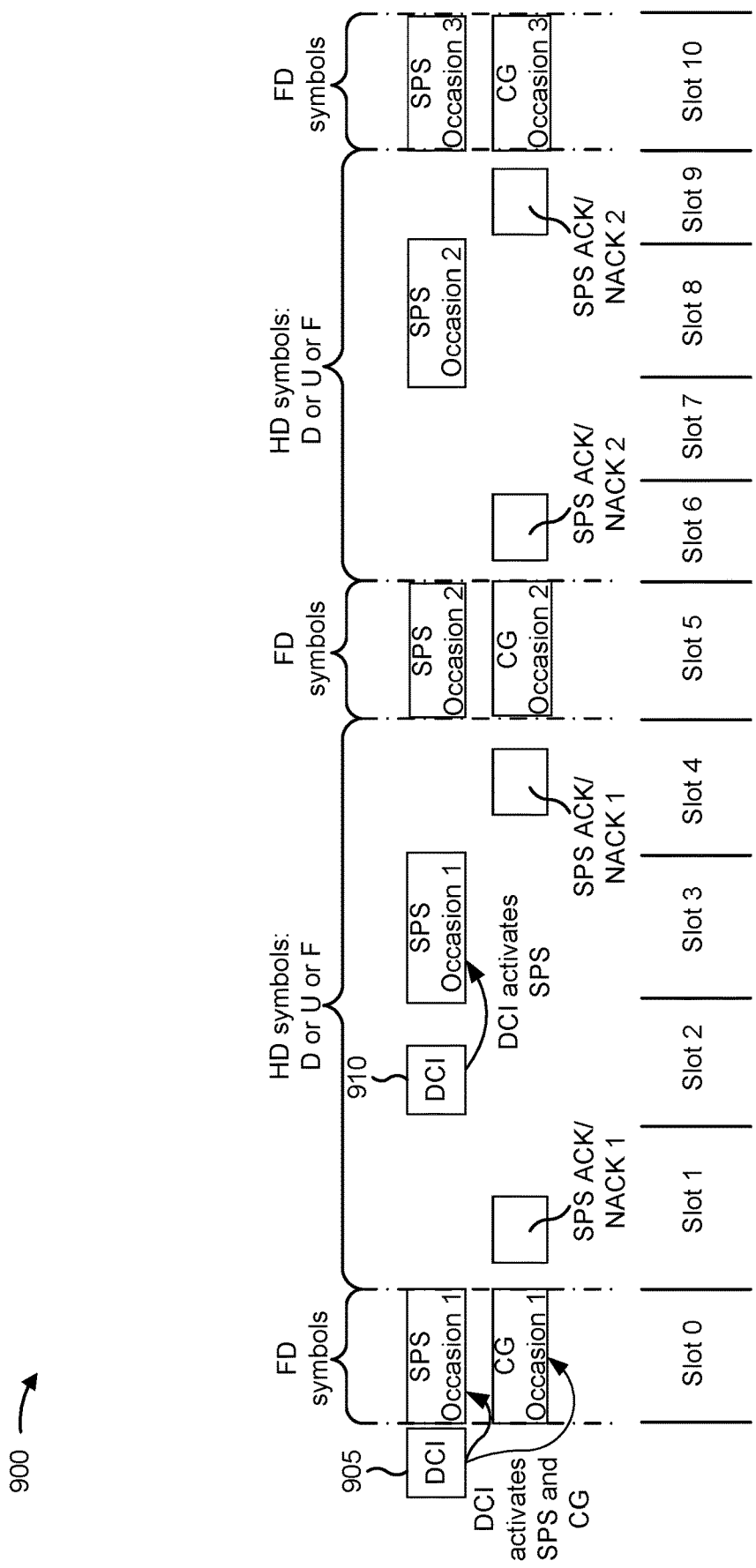

FIG. 9 is a diagram illustrating an example 900 associated with activation and periodicity indications for full duplex and half duplex transmissions of periodic communications, in accordance with the present disclosure. As shown in FIG. 9, a resource allocation may indicate a combination of full duplex and half duplex (e.g., D, U, or F) time domain resources (e.g., slots and/or symbols), shown as an FD slot for slot 0, half duplex (HD) slots for slots 1 through 4, an FD slot for slot 5, HD slots for slots 6 through 9, an FD slot for slot 10, and so on (the slots may be the same length or duration). In example 900, a base station has configured a UE with a full duplex SPS configuration, a full duplex CG configuration, and a half duplex SPS configuration.

As shown by reference number 905, prior to slot 0, a UE may receive (e.g., using communication manager 140, reception component 1502, reception component 1602, and/or controller/processors 280) activation DCI that activates a full duplex periodic communication configuration. For example, the activation DCI may activate both a full duplex SPS configuration and a full duplex CG configuration. The UE may operate in a full duplex mode to simultaneously receive an SPS communication in an SPS occasion (shown as SPS occasion 1, corresponding to first full duplex SPS occasion) and transmit a CG communication in a CG occasion (shown as CG occasion 1) in slot 0. The UE may transmit an ACK or negative acknowledgement (NACK), corresponding to the full duplex SPS communication, to the base station in slot 1.

As shown by reference number 910, the UE may receive (e.g., using communication manager 140, reception component 1502, reception component 1602, and/or controller/processors 280) activation DCI that activates a half duplex periodic communication in slot 2. Thus, in example 900, a first DCI message is used to activate full duplex periodic communications and a second DCI message is used to activate half duplex periodic communications. The UE may operate in a half duplex mode to receive an SPS communication in an SPS occasion (shown as SPS occasion 1, corresponding to first half duplex SPS occasion) in slot 3. The UE may transmit an ACK or NACK, corresponding to the half duplex SPS communication, to the base station in slot 4.

As further shown in FIG. 9, the UE may operate in a full duplex mode to simultaneously receive an SPS communication in an SPS occasion (shown as SPS occasion 2, corresponding to second full duplex SPS occasion) and transmit a CG communication in a CG occasion (shown as CG occasion 2) in slot 5. In example 900, the full duplex CG configuration and/or the full duplex SPS configuration may indicate a periodicity that causes the UE to transmit and receive in slot 5. In one example, the configuration may indicate a periodicity of 1 slot and may also indicate that the periodicity applies to only full duplex slots. In this case, the UE transmits a CG communication and receives an SPS communication in every full duplex slot, counting only full duplex slots (e.g., slot 0, slot 5, slot 10, and so on, not counting slots 1 through 4 or 6 through 9). As another example, the configuration may indicate a periodicity of 5 slots and may also indicate that the periodicity applies to both full duplex slots and half duplex slots. In this case, the UE transmits a CG communication and receives an SPS communication in every fifth slot, counting both full duplex and half duplex slots (e.g., slot 0, slot 5, slot 10, and so on).

Similarly, the half duplex SPS configuration may indicate a periodicity that causes the UE to monitor for a half duplex SPS communication in slot 3, slot 8, and so on. In one example, the configuration may indicate a periodicity of 4 slots and may also indicate that the periodicity applies to only half duplex slots. In this case, the UE receives a half duplex SPS communication in every fourth half duplex slot, counting only half duplex slots (e.g., slot 3, slot 8, and so on, not counting slot 5). As another example, the configuration may indicate a periodicity of 5 slots and may also indicate that the periodicity applies to both full duplex slots and half duplex slots. In this case, the UE receives a half duplex SPS communication in every fifth slot, counting both full duplex and half duplex slots (e.g., slot 3, slot 8, and so on).

As indicated above, FIG. 9 is provided as an example. Other examples may differ from what is described with respect to FIG. 9.

Figure 10:
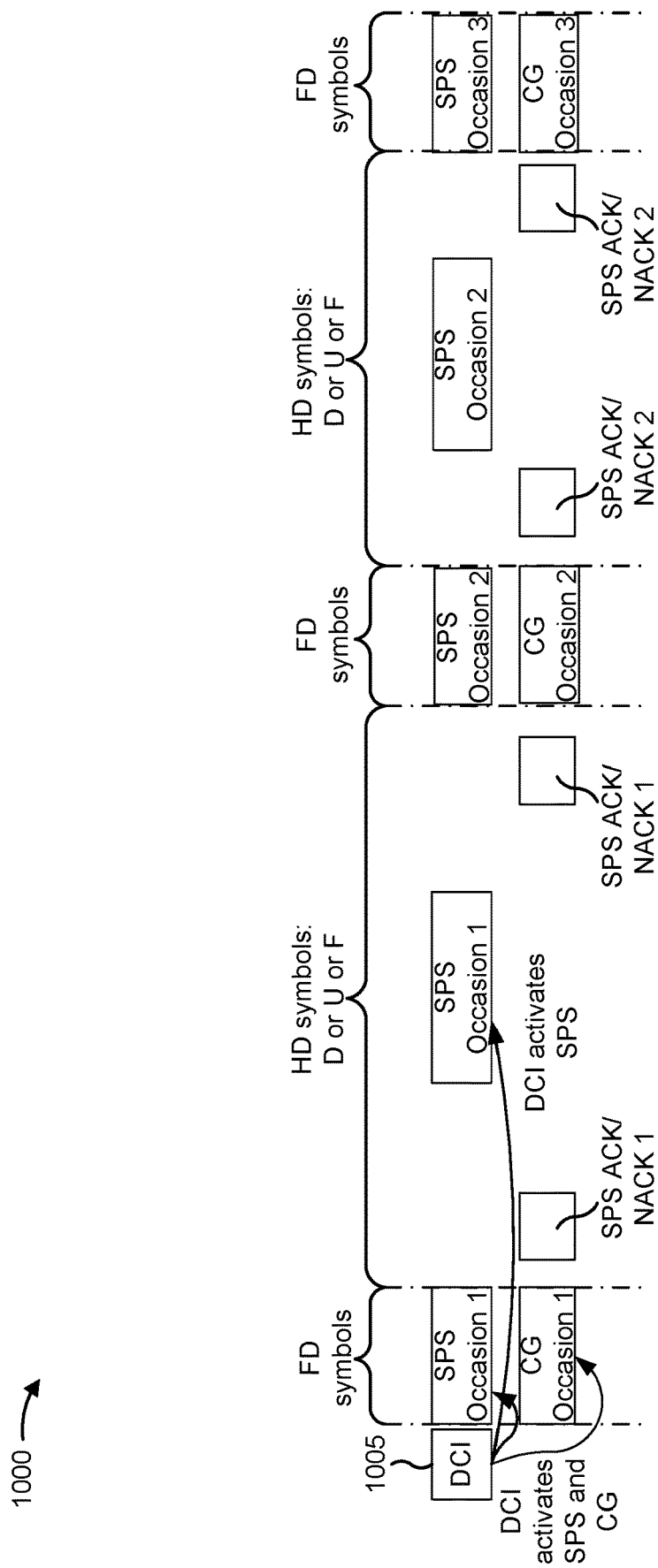

FIG. 10 is a diagram illustrating an example 1000 associated with activation and periodicity indications for full duplex and half duplex transmissions of periodic communications, in accordance with the present disclosure. FIG. 10 is similar to FIG. 9, except that a single DCI message is used to activate both full duplex periodic communications and half duplex periodic communications, rather than separate DCI messages.

As shown by reference number 1005, prior to slot 0, a UE may receive (e.g., using communication manager 140, reception component 1502, reception component 1602, and/or controller/processors 280) activation DCI that activates a full duplex periodic communication configuration and a half duplex periodic communication configuration. For example, the activation DCI may activate a full duplex SPS configuration, a full duplex CG configuration, and a half duplex SPS configuration. The UE may then operate as described above in connection with FIG. 9, except that the base station does not transmit, and the UE does not receive, separate DCI to activate only the half duplex SPS configuration.

As indicated above, FIG. 10 is provided as an example. Other examples may differ from what is described with respect to FIG. 10.

Figure 11:
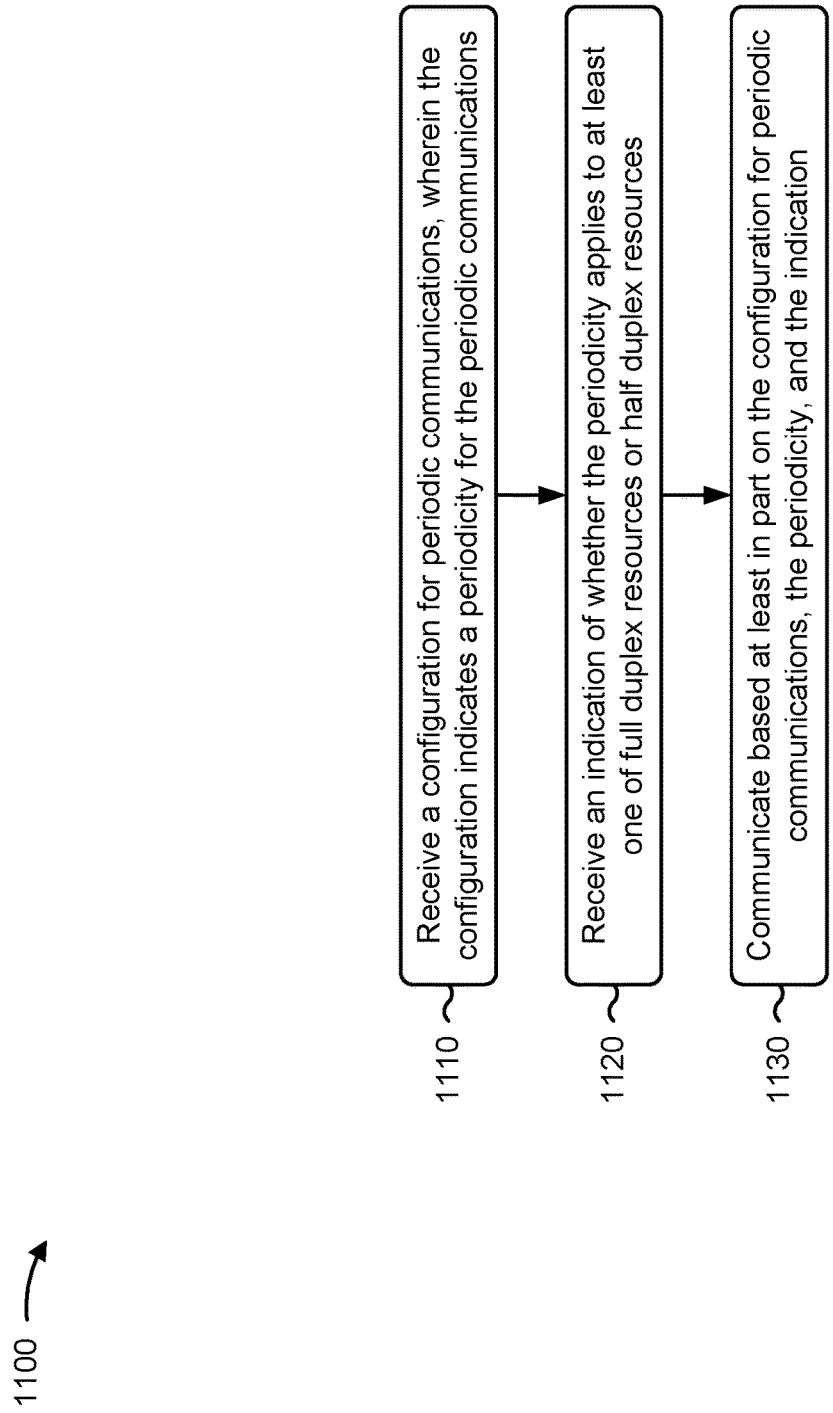
FIGS. 11-14 are diagrams illustrating example processes associated with activation and/or periodicity indications for full duplex and half duplex transmissions of periodic communications, in accordance with the present disclosure.

FIG. 11 is a diagram illustrating an example process 1100 performed, for example, by a wireless communication device, in accordance with the present disclosure. Example process 1100 is an example where the wireless communication device (e.g., UE 120) performs operations associated with activation and periodicity indications for full duplex and half duplex transmissions of periodic communications.

As shown in FIG. 11, in some aspects, process 1100 may include receiving a configuration for periodic communications, wherein the configuration indicates a periodicity for the periodic communications (block 1110). For example, the wireless communication device (e.g., using communication manager 140 and/or reception component 1502, depicted in FIG. 15) may receive a configuration for periodic communications, wherein the configuration indicates a periodicity for the periodic communications, as described elsewhere herein, for example, in connection with reference number 705 of FIG. 7 and/or reference number 805 of FIG. 8.

As further shown in FIG. 11, in some aspects, process 1100 may include receiving an indication of whether the periodicity applies to at least one of full duplex resources or half duplex resources (block 1120). For example, the wireless communication device (e.g., using communication manager 140 and/or reception component 1502, depicted in FIG. 15) may receive an indication of whether the periodicity applies to at least one of full duplex resources or half duplex resources, as described elsewhere herein, for example, in connection with reference number 705 of FIG. 7 and/or reference number 805 of FIG. 8.

As further shown in FIG. 11, in some aspects, process 1100 may include communicating based at least in part on the configuration for periodic communications, the periodicity, and the indication (block 1130). For example, the wireless communication device (e.g., using communication manager 140, reception component 1502, and/or transmission component 1504, depicted in FIG. 15) may communicate based at least in part on the configuration for periodic communications, the periodicity, and the indication, as described elsewhere herein, for example, in connection with reference number 720 of FIG. 7 and/or reference number 825 of FIG. 8.

Process 1100 may include additional aspects, such as any single aspect or any combination of aspects described below and/or in connection with one or more other processes described elsewhere herein.

In a first aspect, the indication indicates whether the periodicity applies only to full duplex resources or only to half duplex resources. In a second aspect, alone or in combination with the first aspect, the indication indicates whether the periodicity applies only to full duplex resources, only to half duplex resources, or to both full duplex resources and half duplex resources. In a third aspect, alone or in combination with one or more of the first and second aspects, process 1100 includes interpreting the periodicity based at least in part on the indication of whether the periodicity applies to at least one of full duplex resources or half duplex resources, and wherein the communicating comprises at least one of transmitting or receiving a periodic communication according to the interpreted periodicity.

In a fourth aspect, alone or in combination with one or more of the first through third aspects, the indication indicates that the periodicity applies only to full duplex resources, and further comprising counting only full duplex resources, and not half duplex resources, toward a count associated with the periodicity based at least in part on the indication that the periodicity applies only to full duplex resources. In a fifth aspect, alone or in combination with one or more of the first through fourth aspects, the indication indicates that the periodicity applies only to half duplex resources, and further comprising counting only half duplex resources, and not full duplex resources, toward a count associated with the periodicity based at least in part on the indication that the periodicity applies only to half duplex resources. In a sixth aspect, alone or in combination with one or more of the first through fifth aspects, the indication indicates that the periodicity applies to both full duplex resources and half duplex resources, and further comprising counting both half duplex resources and full duplex resources toward a count associated with the periodicity based at least in part on the indication that the periodicity applies to both full duplex resources and half duplex resources.

In a seventh aspect, alone or in combination with one or more of the first through sixth aspects, process 1100 includes identifying full duplex resources and half duplex resources, for interpreting the periodicity, based at least in part on an indication of a slot format, or multiple sidelink resource pools, wherein a first sidelink resource pool includes only half duplex resources and a second sidelink resource pool includes only full duplex resources. In an eighth aspect, alone or in combination with one or more of the first through seventh aspects, a first DCI message is used to activate periodic communications in full duplex resources and a second DCI message is used to activate periodic communications in half duplex resources.

In a ninth aspect, alone or in combination with one or more of the first through eighth aspects, a single DCI message is used to activate periodic communications in full duplex resources and to activate periodic communications in half duplex resources. In a tenth aspect, alone or in combination with one or more of the first through ninth aspects, the single DCI message indicates a first set of TCI states for full duplex periodic communications and a second set of TCI states for half duplex periodic communications. In an eleventh aspect, alone or in combination with one or more of the first through tenth aspects, the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message. In a twelfth aspect, alone or in combination with one or more of the first through eleventh aspects, the first set of TCI states and the second set of TCI states are indicated using a single value in the single DCI message. In a thirteenth aspect, alone or in combination with one or more of the first through twelfth aspects, process 1100 includes receiving an indication of a mapping between a set of values and a corresponding one or more sets of TCI states. In a fourteenth aspect, alone or in combination with one or more of the first through thirteenth aspects, the configuration for periodic communications includes at least one of a semi-persistent scheduling configuration or a configured grant configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
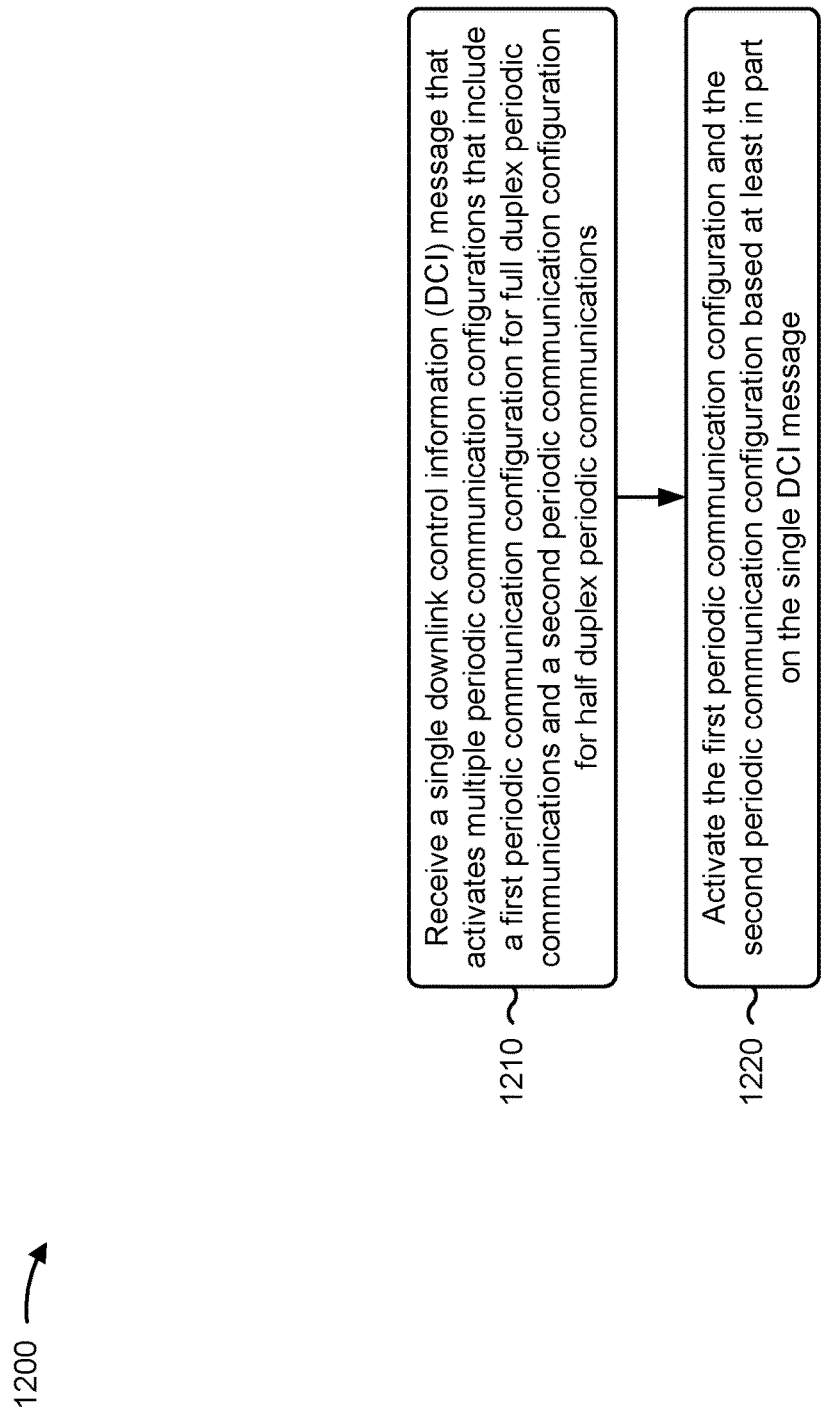

FIG. 12 is a diagram illustrating an example process 1200 performed, for example, by a wireless communication device, in accordance with the present disclosure. Example process 1200 is an example where the wireless communication device (e.g., UE 120) performs operations associated with activation for full duplex and half duplex transmissions of periodic communications.

As shown in FIG. 12, in some aspects, process 1200 may include receiving a single DCI message that activates multiple periodic communication configurations that include a first periodic communication configuration for full duplex periodic communications and a second periodic communication configuration for half duplex periodic communications (block 1210). For example, the wireless communication device (e.g., using communication manager 140 and/or reception component 1602, depicted in FIG. 16) may receive a single DCI message that activates multiple periodic communication configurations that include a first periodic communication configuration for full duplex periodic communications and a second periodic communication configuration for half duplex periodic communications, as described elsewhere herein, for example, in connection with reference number 710 of FIG. 7 and/or reference number 810 of FIG. 8.

As further shown in FIG. 12, in some aspects, process 1200 may include activating the first periodic communication configuration and the second periodic communication configuration based at least in part on the single DCI message (block 1220). For example, the wireless communication device (e.g., using communication manager 140 and/or activation component 1608, depicted in FIG. 16) may activate the first periodic communication configuration and the second periodic communication configuration based at least in part on the single DCI message, as described elsewhere herein, for example, in connection with reference number 815 of FIG. 8.

Process 1200 may include additional aspects, such as any single aspect or any combination of aspects described below and/or in connection with one or more other processes described elsewhere herein.

In a first aspect, the single DCI message indicates a first set of TCI states for the full duplex periodic communications and a second set of TCI states for the half duplex periodic communications. In a second aspect, alone or in combination with the first aspect, the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message. In a third aspect, alone or in combination with one or more of the first and second aspects, the first set of TCI states and the second set of TCI states are indicated using a single value in the single DCI message.

In a fourth aspect, alone or in combination with one or more of the first through third aspects, process 1200 includes receiving an indication of a mapping between a set of values and a corresponding one or more sets of TCI states. In a fifth aspect, alone or in combination with one or more of the first through fourth aspects, process 1200 includes receiving another DCI message that deactivates the multiple periodic communication configurations, and deactivating at least one of the first periodic communication configuration or the second periodic communication configuration based at least in part on the other DCI message. In a sixth aspect, alone or in combination with one or more of the first through fifth aspects, the multiple periodic communication configurations include at least one of a semi-persistent scheduling configuration or a configured grant configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
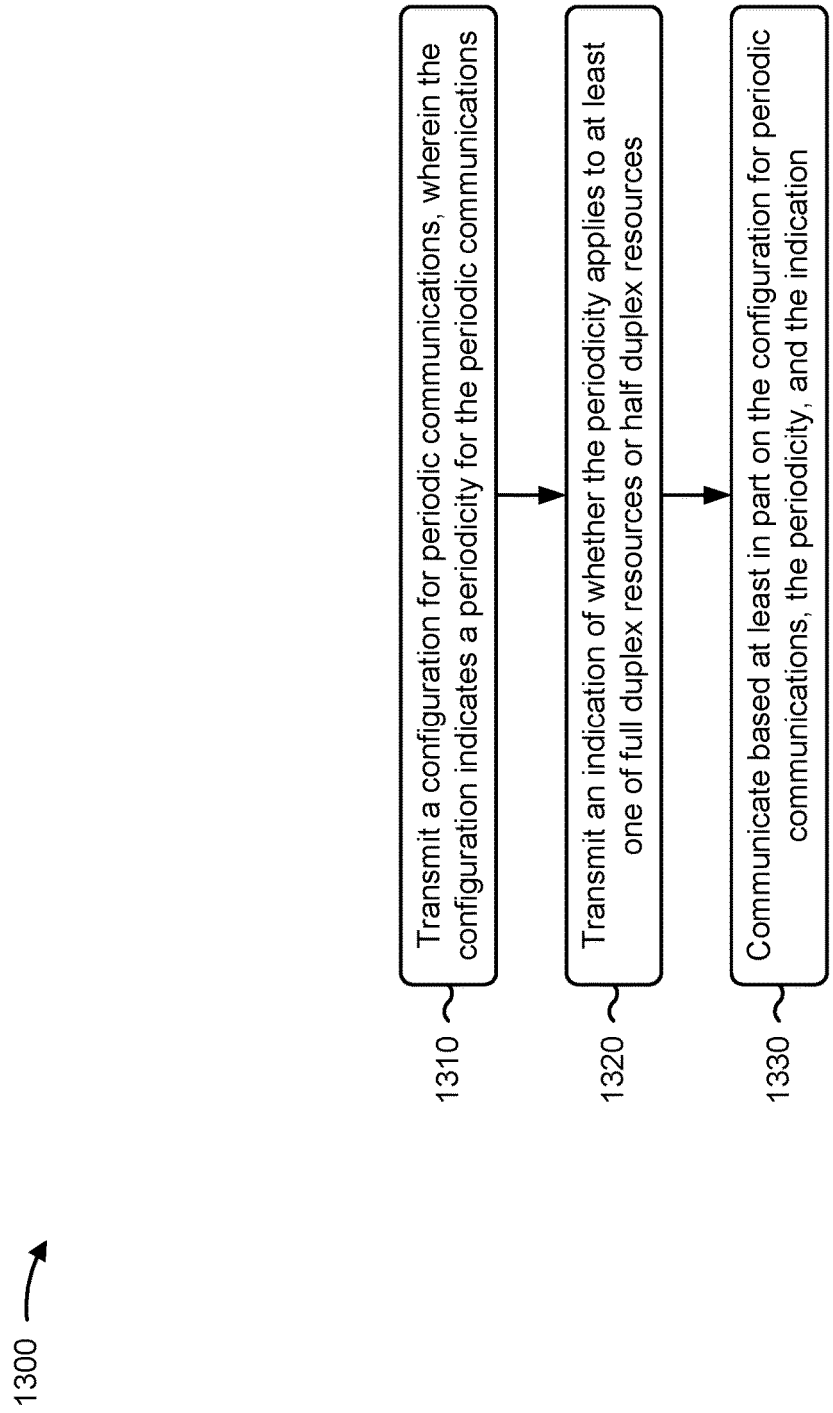

FIG. 13 is a diagram illustrating an example process 1300 performed, for example, by a base station, in accordance with the present disclosure. Example process 1300 is an example where the base station (e.g., base station 110) performs operations associated with activation and periodicity indications for full duplex and half duplex transmissions of periodic communications.

As shown in FIG. 13, in some aspects, process 1300 may include transmitting a configuration for periodic communications, wherein the configuration indicates a periodicity for the periodic communications (block 1310). For example, the base station (e.g., using communication manager 150 and/or transmission component 1704, depicted in FIG. 17) may transmit a configuration for periodic communications, wherein the configuration indicates a periodicity for the periodic communications, as described elsewhere herein, for example, in connection with reference number 705 of FIG. 7 and/or reference number 805 of FIG. 8.

As further shown in FIG. 13, in some aspects, process 1300 may include transmitting an indication of whether the periodicity applies to at least one of full duplex resources or half duplex resources (block 1320). For example, the base station (e.g., using communication manager 150 and/or transmission component 1704, depicted in FIG. 17) may transmit an indication of whether the periodicity applies to at least one of full duplex resources or half duplex resources, as described elsewhere herein, for example, in connection with reference number 705 of FIG. 7 and/or reference number 805 of FIG. 8.

As further shown in FIG. 13, in some aspects, process 1300 may include communicating based at least in part on the configuration for periodic communications, the periodicity, and the indication (block 1330). For example, the base station (e.g., using communication manager 150, reception component 1702, and/or transmission component 1704, depicted in FIG. 17) may communicate based at least in part on the configuration for periodic communications, the periodicity, and the indication, as described elsewhere herein, for example, in connection with reference number 720 of FIG. 7 and/or reference number 825 of FIG. 8.

Process 1300 may include additional aspects, such as any single aspect or any combination of aspects described below and/or in connection with one or more other processes described elsewhere herein.

In a first aspect, the indication indicates whether the periodicity applies only to full duplex resources or only to half duplex resources. In a second aspect, alone or in combination with the first aspect, the indication indicates whether the periodicity applies only to full duplex resources, only to half duplex resources, or to both full duplex resources and half duplex resources. In a third aspect, alone or in combination with one or more of the first and second aspects, process 1300 includes interpreting the periodicity based at least in part on the indication of whether the periodicity applies to at least one of full duplex resources or half duplex resources, and wherein the communicating comprises at least one of transmitting or receiving a periodic communication according to the interpreted periodicity.

In a fourth aspect, alone or in combination with one or more of the first through third aspects, the indication indicates that the periodicity applies only to full duplex resources, and further comprising counting only full duplex resources, and not half duplex resources, toward a count associated with the periodicity based at least in part on the indication that the periodicity applies only to full duplex resources. In a fifth aspect, alone or in combination with one or more of the first through fourth aspects, the indication indicates that the periodicity applies only to half duplex resources, and further comprising counting only half duplex resources, and not full duplex resources, toward a count associated with the periodicity based at least in part on the indication that the periodicity applies only to half duplex resources. In a sixth aspect, alone or in combination with one or more of the first through fifth aspects, the indication indicates that the periodicity applies to both full duplex resources and half duplex resources, and further comprising counting both half duplex resources and full duplex resources toward a count associated with the periodicity based at least in part on the indication that the periodicity applies to both full duplex resources and half duplex resources.

In a seventh aspect, alone or in combination with one or more of the first through sixth aspects, process 1300 includes identifying full duplex resources and half duplex resources, for interpreting the periodicity, based at least in part on an indication of a slot format, or multiple sidelink resource pools, wherein a first sidelink resource pool includes only half duplex resources and a second sidelink resource pool includes only full duplex resources. In an eighth aspect, alone or in combination with one or more of the first through seventh aspects, a first DCI message is used to activate periodic communications in full duplex resources and a second DCI message is used to activate periodic communications in half duplex resources. In a ninth aspect, alone or in combination with one or more of the first through eighth aspects, a single DCI message is used to activate periodic communications in full duplex resources and to activate periodic communications in half duplex resources. In a tenth aspect, alone or in combination with one or more of the first through ninth aspects, the single DCI message indicates a first set of TCI states for full duplex periodic communications and a second set of TCI states for half duplex periodic communications. In an eleventh aspect, alone or in combination with one or more of the first through tenth aspects, the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message. In a twelfth aspect, alone or in combination with one or more of the first through eleventh aspects, the first set of TCI states and the second set of TCI states are indicated using a single value in the single DCI message.

In a thirteenth aspect, alone or in combination with one or more of the first through twelfth aspects, process 1300 includes transmitting an indication of a mapping between a set of values and a corresponding one or more sets of TCI states. In a fourteenth aspect, alone or in combination with one or more of the first through thirteenth aspects, the configuration for periodic communications includes at least one of a semi-persistent scheduling configuration or a configured grant configuration.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
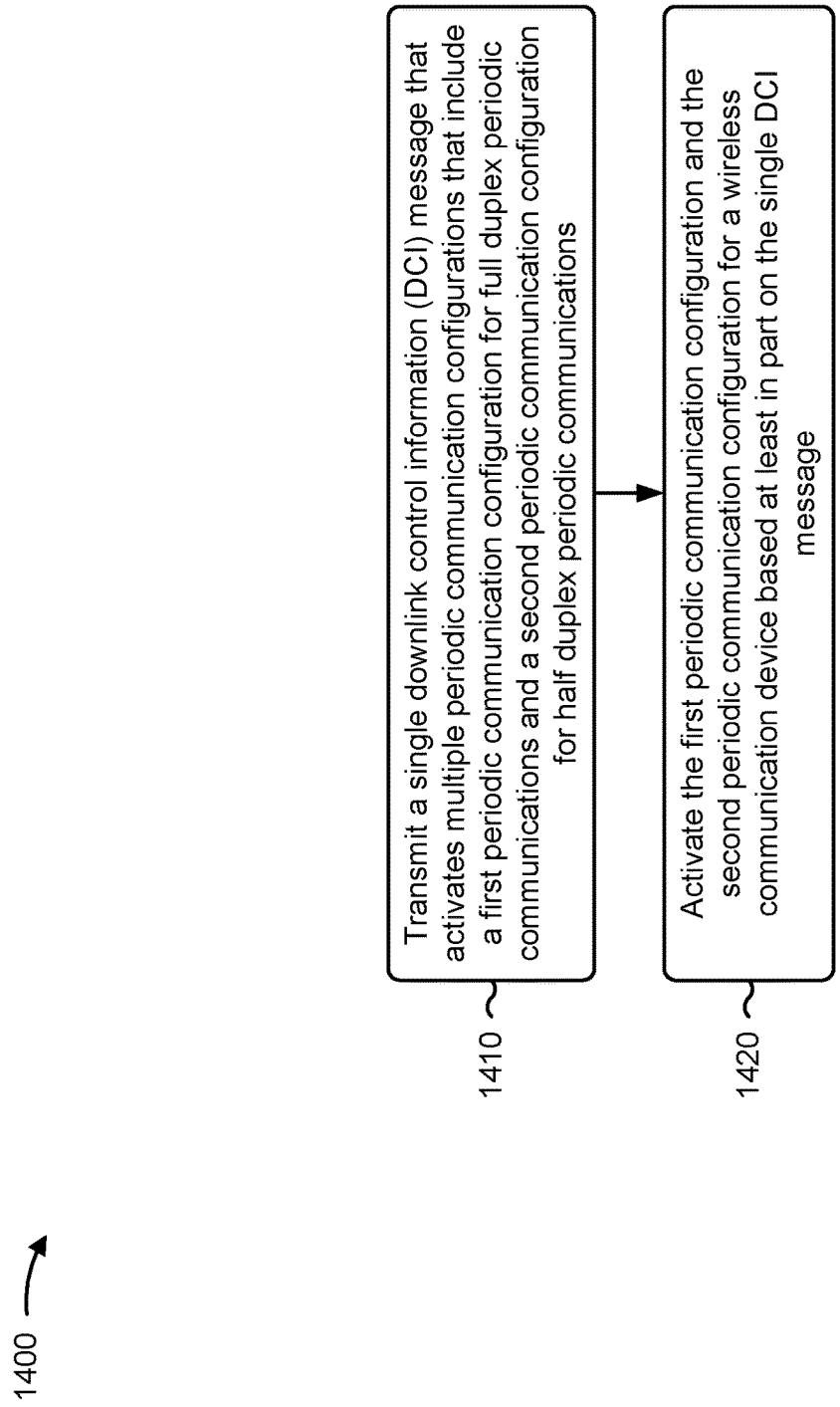

FIG. 14 is a diagram illustrating an example process 1400 performed, for example, by a base station, in accordance with the present disclosure. Example process 1400 is an example where the base station (e.g., base station 110) performs operations associated with activation for full duplex and half duplex transmissions of periodic communications.

As shown in FIG. 14, in some aspects, process 1400 may include transmitting a single DCI message that activates multiple periodic communication configurations that include a first periodic communication configuration for full duplex periodic communications and a second periodic communication configuration for half duplex periodic communications (block 1410). For example, the base station (e.g., using communication manager 150 and/or transmission component 1804, depicted in FIG. 18) may transmit a single DCI message that activates multiple periodic communication configurations that include a first periodic communication configuration for full duplex periodic communications and a second periodic communication configuration for half duplex periodic communications, as described elsewhere herein, for example, in connection with reference number 710 of FIG. 7 and/or reference number 810 of FIG. 8.

As further shown in FIG. 14, in some aspects, process 1400 may include activating the first periodic communication configuration and the second periodic communication configuration for a wireless communication device based at least in part on the single DCI message (block 1420). For example, the base station (e.g., using communication manager 150 and/or activation component 1808, depicted in FIG. 18) may activate the first periodic communication configuration and the second periodic communication configuration for a wireless communication device based at least in part on the single DCI message, as described elsewhere herein, for example, in connection with reference number 815 of FIG. 8.

Process 1400 may include additional aspects, such as any single aspect or any combination of aspects described below and/or in connection with one or more other processes described elsewhere herein.

In a first aspect, the single DCI message indicates a first set of TCI states for the full duplex periodic communications and a second set of TCI states for the half duplex periodic communications. In a second aspect, alone or in combination with the first aspect, the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message. In a third aspect, alone or in combination with one or more of the first and second aspects, the first set of TCI states and the second set of TCI states are indicated using a single value in the single DCI message.

In a fourth aspect, alone or in combination with one or more of the first through third aspects, process 1400 includes transmitting an indication of a mapping between a set of values and a corresponding one or more sets of TCI states. In a fifth aspect, alone or in combination with one or more of the first through fourth aspects, process 1400 includes transmitting another DCI message that deactivates the multiple periodic communication configurations, and deactivating at least one of the first periodic communication configuration or the second periodic communication configuration based at least in part on the other DCI message. In a sixth aspect, alone or in combination with one or more of the first through fifth aspects, the multiple periodic communication configurations include at least one of a semi-persistent scheduling configuration or a configured grant configuration.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
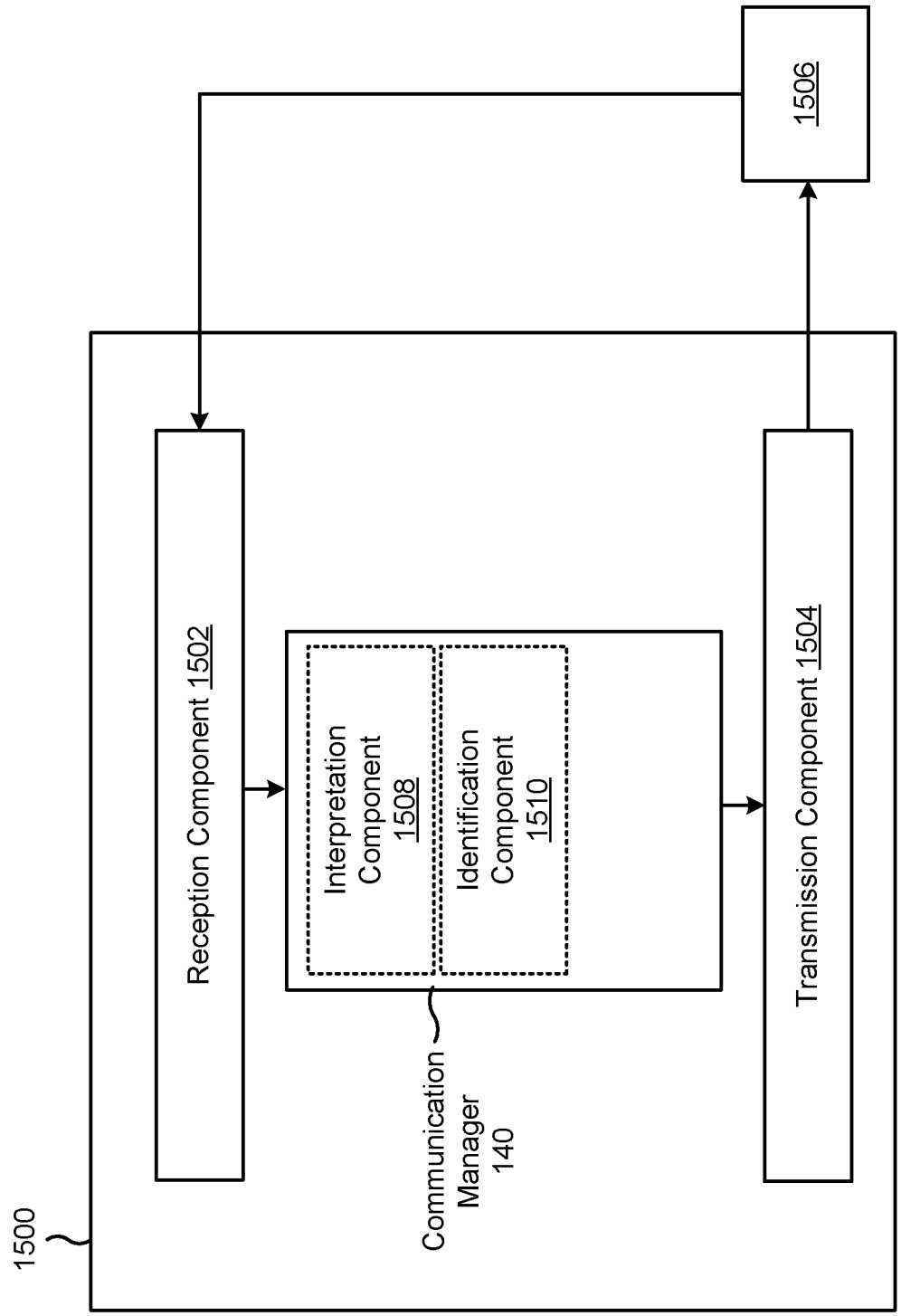
FIGS. 15-18 are diagrams of example apparatuses for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of an interpretation component 1508 or an identification component 1510, among other examples.

In some aspects, the apparatus 1500 may be configured to perform one or more operations described herein in connection with FIGS. 7-10. Additionally, or alternatively, the apparatus 1500 may be configured to perform one or more processes described herein, such as process 1100 of FIG. 11, process 1200 of FIG. 12, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive a configuration for periodic communications, wherein the configuration indicates a periodicity for the periodic communications. The reception component 1502 may receive an indication of whether the periodicity applies to at least one of full duplex resources or half duplex resources. The reception component 1502 and/or the transmission component 1504 may communicate based at least in part on the configuration for periodic communications, the periodicity, and the indication.

The interpretation component 1508 may interpret the periodicity based at least in part on the indication of whether the periodicity applies to at least one of full duplex resources or half duplex resources wherein the communicating comprises at least one of transmitting or receiving a periodic communication according to the interpreted periodicity. The identification component 1510 may identify full duplex resources and half duplex resources, for interpreting the periodicity, based at least in part on an indication of a slot format or multiple sidelink resource pools, wherein a first sidelink resource pool includes only half duplex resources and a second sidelink resource pool includes only full duplex resources. The reception component 1502 may receive an indication of a mapping between a set of values and a corresponding one or more sets of TCI states.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
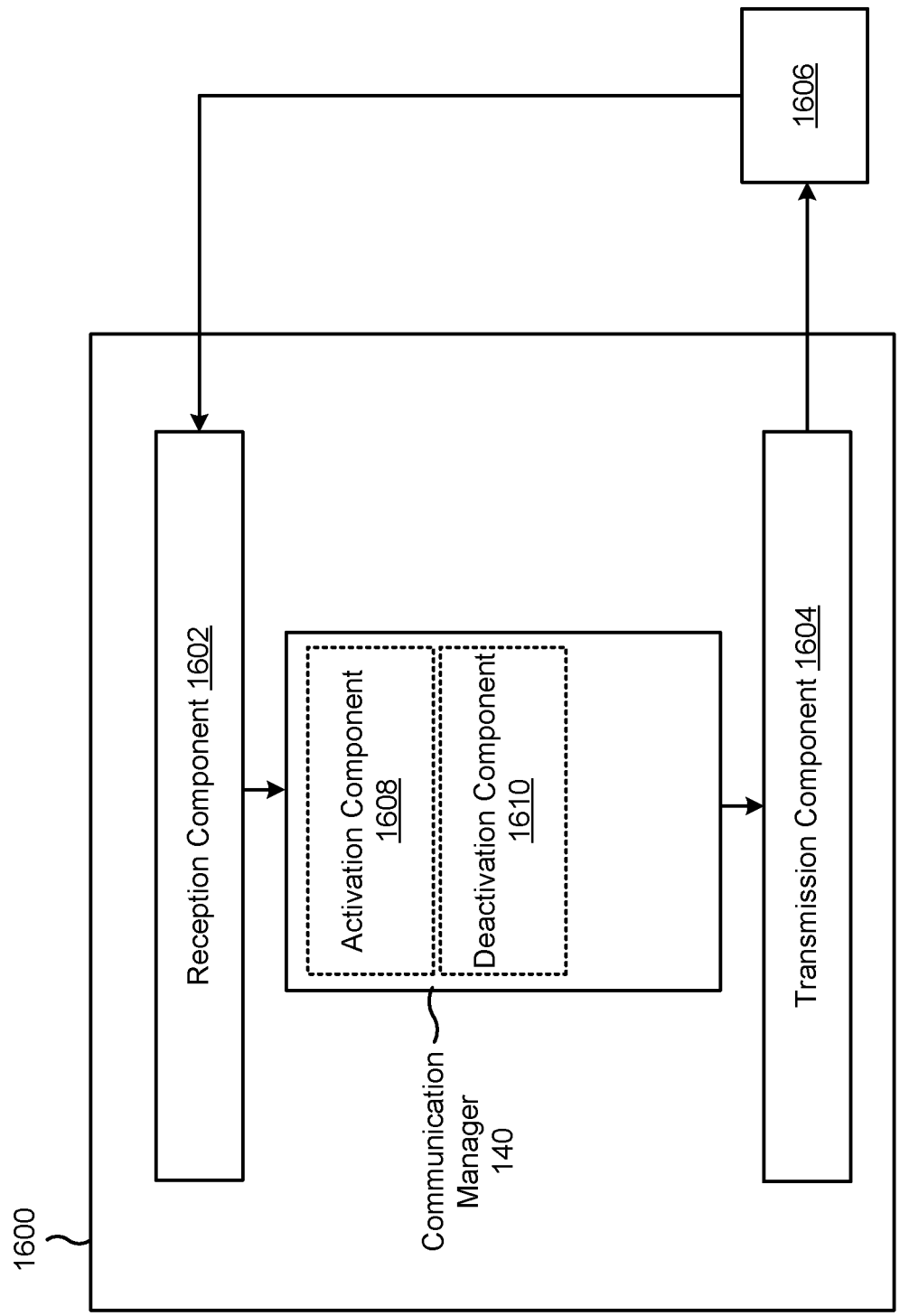

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of an activation component 1608 or a deactivation component 1610, among other examples.

In some aspects, the apparatus 1600 may be configured to perform one or more operations described herein in connection with FIGS. 7-10. Additionally, or alternatively, the apparatus 1600 may be configured to perform one or more processes described herein, such as process 1100 of FIG. 11, process 1200 of FIG. 12, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive a single DCI message that activates multiple periodic communication configurations that include a first periodic communication configuration for full duplex periodic communications and a second periodic communication configuration for half duplex periodic communications. The activation component 1608 may activate the first periodic communication configuration and the second periodic communication configuration based at least in part on the single DCI message.

The reception component 1602 may receive an indication of a mapping between a set of values and a corresponding one or more sets of TCI states. The reception component 1602 may receive another DCI message that deactivates the multiple periodic communication configurations. The deactivation component 1610 may deactivate at least one of the first periodic communication configuration or the second periodic communication configuration based at least in part on the other DCI message.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
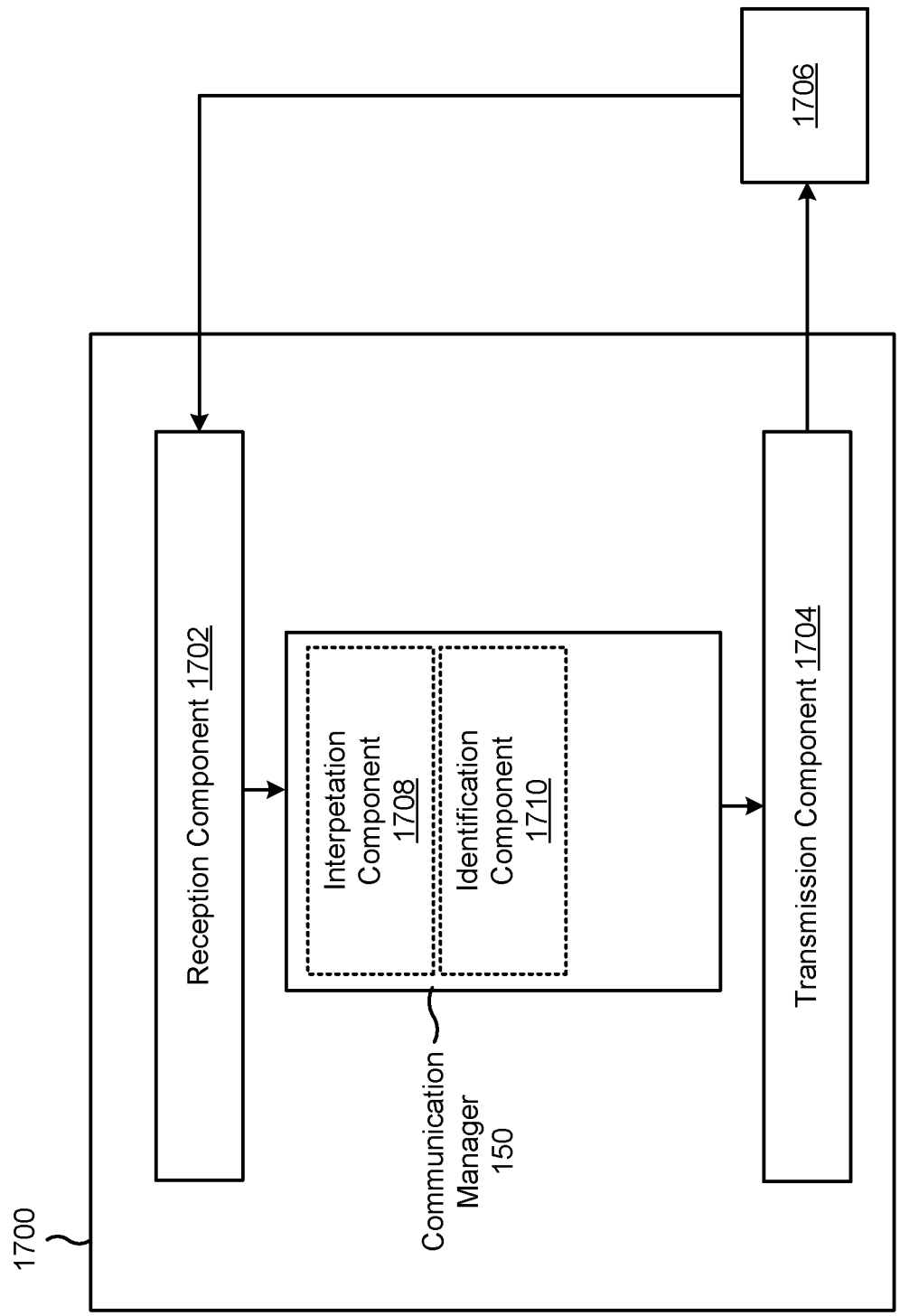

FIG. 17 is a diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include one or more of an interpretation component 1708 or an identification component 1710, among other examples.

In some aspects, the apparatus 1700 may be configured to perform one or more operations described herein in connection with FIGS. 7-10. Additionally, or alternatively, the apparatus 1700 may be configured to perform one or more processes described herein, such as process 1300 of FIG. 13, process 1400 of FIG. 14, or a combination thereof. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The transmission component 1704 may transmit a configuration for periodic communications, wherein the configuration indicates a periodicity for the periodic communications. The transmission component 1704 may transmit an indication of whether the periodicity applies to at least one of full duplex resources or half duplex resources. The reception component 1702 and/or the transmission component 1704 may communicate based at least in part on the configuration for periodic communications, the periodicity, and the indication.

The interpretation component 1708 may interpret the periodicity based at least in part on the indication of whether the periodicity applies to at least one of full duplex resources or half duplex resources wherein the communicating comprises at least one of transmitting or receiving a periodic communication according to the interpreted periodicity. The identification component 1710 may identify full duplex resources and half duplex resources, for interpreting the periodicity, based at least in part on an indication of a slot format, or multiple sidelink resource pools, wherein a first sidelink resource pool includes only half duplex resources and a second sidelink resource pool includes only full duplex resources. The transmission component 1704 may transmit an indication of a mapping between a set of values and a corresponding one or more sets of TCI states.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
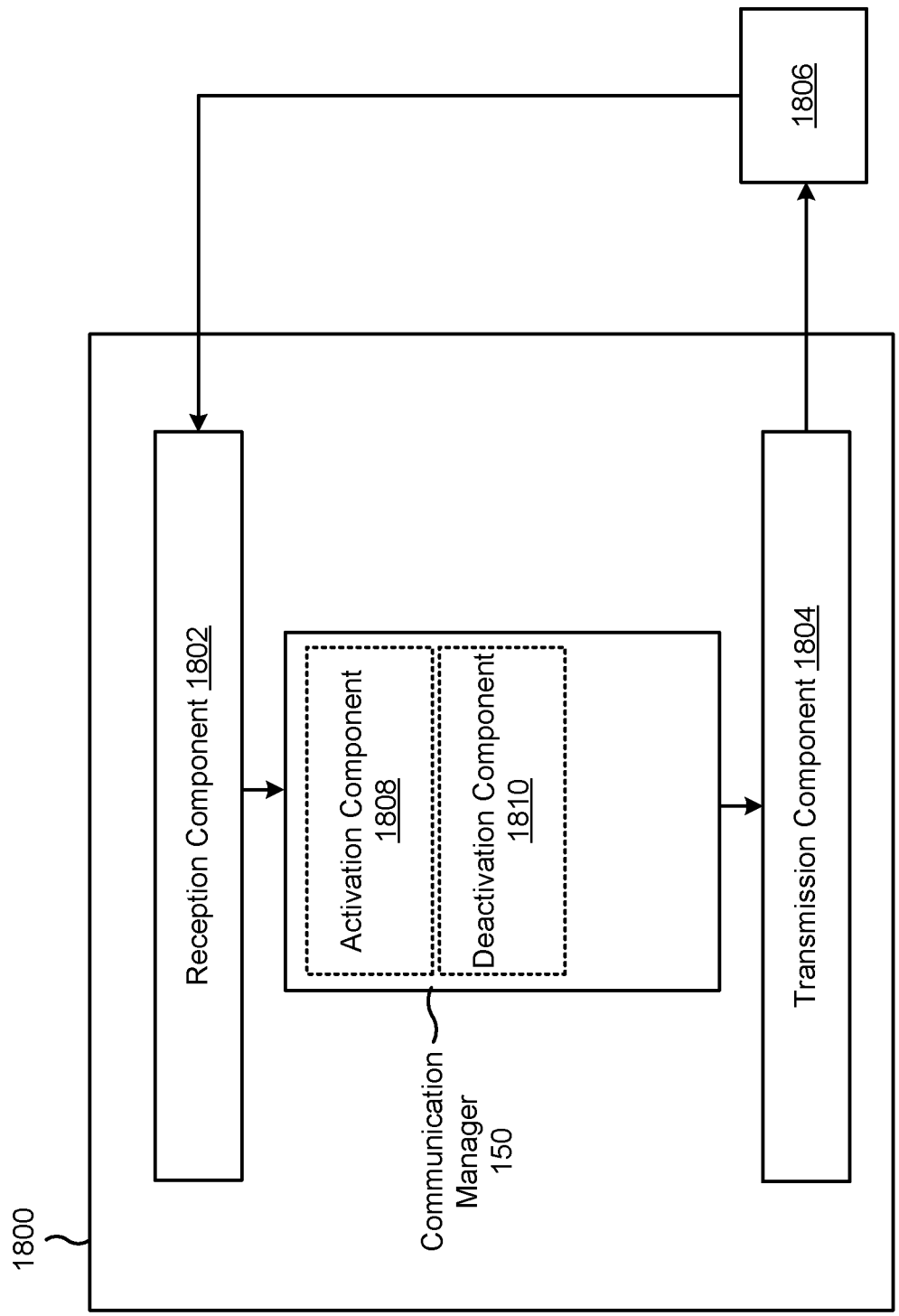

FIG. 18 is a diagram of an example apparatus 1800 for wireless communication. The apparatus 1800 may be a base station, or a base station may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 150. The communication manager 150 may include one or more of an activation component 1808 or a deactivation component 1810, among other examples.

In some aspects, the apparatus 1800 may be configured to perform one or more operations described herein in connection with FIGS. 7-10. Additionally, or alternatively, the apparatus 1800 may be configured to perform one or more processes described herein, such as process 1300 of FIG. 13, process 1400 of FIG. 14, or a combination thereof. In some aspects, the apparatus 1800 and/or one or more components shown in FIG. 18 may include one or more components of the base station described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a modem, a demodulator, a MIMO detector, a receive processor, a controller/processor, a memory, or a combination thereof, of the base station described in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the base station described in connection with FIG. 2. In some aspects, the transmission component 1804 may be co-located with the reception component 1802 in a transceiver.

The transmission component 1804 may transmit a single DCI message that activates multiple periodic communication configurations that include a first periodic communication configuration for full duplex periodic communications and a second periodic communication configuration for half duplex periodic communications. The activation component 1808 may activate the first periodic communication configuration and the second periodic communication configuration for a wireless communication device based at least in part on the single DCI message.

The transmission component 1804 may transmit an indication of a mapping between a set of values and a corresponding one or more sets of TCI states. The transmission component 1804 may transmit another DCI message that deactivates the multiple periodic communication configurations. The deactivation component 1810 may deactivate at least one of the first periodic communication configuration or the second periodic communication configuration based at least in part on the other DCI message.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a wireless communication device, comprising: receiving a configuration for periodic communications, wherein the configuration indicates a periodicity for the periodic communications; receiving an indication of whether the periodicity applies to at least one of full duplex resources or half duplex resources; and communicating based at least in part on the configuration for periodic communications, the periodicity, and the indication.

Aspect 2: The method of Aspect 1, wherein the indication indicates whether the periodicity applies only to full duplex resources or only to half duplex resources.

Aspect 3: The method of Aspect 1, wherein the indication indicates whether the periodicity applies only to full duplex resources, only to half duplex resources, or to both full duplex resources and half duplex resources.

Aspect 4: The method of any of Aspects 1-3, further comprising interpreting the periodicity based at least in part on the indication of whether the periodicity applies to at least one of full duplex resources or half duplex resources; and wherein the communicating comprises at least one of transmitting or receiving a periodic communication according to the interpreted periodicity.

Aspect 5: The method of any of Aspects 1-4, wherein the indication indicates that the periodicity applies only to full duplex resources; and further comprising: counting only full duplex resources, and not half duplex resources, toward a count associated with the periodicity based at least in part on the indication that the periodicity applies only to full duplex resources.

Aspect 6: The method of any of Aspects 1-4, wherein the indication indicates that the periodicity applies only to half duplex resources; and further comprising: counting only half duplex resources, and not full duplex resources, toward a count associated with the periodicity based at least in part on the indication that the periodicity applies only to half duplex resources.

Aspect 7: The method of any of Aspects 1-4, wherein the indication indicates that the periodicity applies to both full duplex resources and half duplex resources; and further comprising: counting both half duplex resources and full duplex resources toward a count associated with the periodicity based at least in part on the indication that the periodicity applies to both full duplex resources and half duplex resources.

Aspect 8: The method of any of Aspects 1-7, further comprising identifying full duplex resources and half duplex resources, for interpreting the periodicity, based at least in part on: an indication of a slot format, or multiple sidelink resource pools, wherein a first sidelink resource pool includes only half duplex resources and a second sidelink resource pool includes only full duplex resources.

Aspect 9: The method of any of Aspects 1-8, wherein a first downlink control information (DCI) message is used to activate periodic communications in full duplex resources and a second DCI message is used to activate periodic communications in half duplex resources.

Aspect 10: The method of any of Aspects 1-8, wherein a single downlink control information (DCI) message is used to activate periodic communications in full duplex resources and to activate periodic communications in half duplex resources.

Aspect 11: The method of Aspect 10, wherein the single DCI message indicates a first set of transmission configuration indication (TCI) states for full duplex periodic communications and a second set of TCI states for half duplex periodic communications.

Aspect 12: The method of Aspect 11, wherein the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message.

Aspect 13: The method of Aspect 11, wherein the first set of TCI states and the second set of TCI states are indicated using a single value in the single DCI message.

Aspect 14: The method of any of Aspects 11-13, further comprising receiving an indication of a mapping between a set of values and a corresponding one or more sets of TCI states.

Aspect 15: The method of any of Aspects 1-14, wherein the configuration for periodic communications includes at least one of a semi-persistent scheduling configuration or a configured grant configuration.

Aspect 16: A method of wireless communication performed by a wireless communication device, comprising: receiving a single downlink control information (DCI) message that activates multiple periodic communication configurations that include a first periodic communication configuration for full duplex periodic communications and a second periodic communication configuration for half duplex periodic communications; and activating the first periodic communication configuration and the second periodic communication configuration based at least in part on the single DCI message.

Aspect 17: The method of Aspect 16, wherein the single DCI message indicates a first set of transmission configuration indication (TCI) states for the full duplex periodic communications and a second set of TCI states for the half duplex periodic communications.

Aspect 18: The method of Aspect 17, wherein the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message.

Aspect 19: The method of Aspect 17, wherein the first set of TCI states and the second set of TCI states are indicated using a single value in the single DCI message.

Aspect 20: The method of any of Aspects 17-19, further comprising receiving an indication of a mapping between a set of values and a corresponding one or more sets of TCI states.

Aspect 21: The method of any of Aspects 16-20, further comprising: receiving another DCI message that deactivates the multiple periodic communication configurations; and deactivating at least one of the first periodic communication configuration or the second periodic communication configuration based at least in part on the other DCI message.

Aspect 22: The method of any of Aspects 16-21, wherein the multiple periodic communication configurations include at least one of a semi-persistent scheduling configuration or a configured grant configuration.

Aspect 23: A method of wireless communication performed by a base station, comprising: transmitting a configuration for periodic communications, wherein the configuration indicates a periodicity for the periodic communications; transmitting an indication of whether the periodicity applies to at least one of full duplex resources or half duplex resources; and communicating based at least in part on the configuration for periodic communications, the periodicity, and the indication.

Aspect 24: The method of Aspect 23, wherein the indication indicates whether the periodicity applies only to full duplex resources or only to half duplex resources.

Aspect 25: The method of Aspect 23, wherein the indication indicates whether the periodicity applies only to full duplex resources, only to half duplex resources, or to both full duplex resources and half duplex resources.

Aspect 26: The method of any of Aspects 23-25, further comprising interpreting the periodicity based at least in part on the indication of whether the periodicity applies to at least one of full duplex resources or half duplex resources; and wherein the communicating comprises at least one of transmitting or receiving a periodic communication according to the interpreted periodicity.

Aspect 27: The method of any of Aspects 23-26, wherein the indication indicates that the periodicity applies only to full duplex resources; and further comprising: counting only full duplex resources, and not half duplex resources, toward a count associated with the periodicity based at least in part on the indication that the periodicity applies only to full duplex resources.

Aspect 28: The method of any of Aspects 23-26, wherein the indication indicates that the periodicity applies only to half duplex resources; and further comprising: counting only half duplex resources, and not full duplex resources, toward a count associated with the periodicity based at least in part on the indication that the periodicity applies only to half duplex resources.

Aspect 29: The method of any of Aspects 23-26, wherein the indication indicates that the periodicity applies to both full duplex resources and half duplex resources; and further comprising: counting both half duplex resources and full duplex resources toward a count associated with the periodicity based at least in part on the indication that the periodicity applies to both full duplex resources and half duplex resources.

Aspect 30: The method of any of Aspects 23-29, further comprising identifying full duplex resources and half duplex resources, for interpreting the periodicity, based at least in part on: an indication of a slot format, or multiple sidelink resource pools, wherein a first sidelink resource pool includes only half duplex resources and a second sidelink resource pool includes only full duplex resources.

Aspect 31: The method of any of Aspects 23-30, wherein a first downlink control information (DCI) message is used to activate periodic communications in full duplex resources and a second DCI message is used to activate periodic communications in half duplex resources.

Aspect 32: The method of any of Aspects 23-30, wherein a single downlink control information (DCI) message is used to activate periodic communications in full duplex resources and to activate periodic communications in half duplex resources.

Aspect 33: The method of Aspect 32, wherein the single DCI message indicates a first set of transmission configuration indication (TCI) states for full duplex periodic communications and a second set of TCI states for half duplex periodic communications.

Aspect 34: The method of Aspect 33, wherein the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message.

Aspect 35: The method of Aspect 33, wherein the first set of TCI states and the second set of TCI states are indicated using a single value in the single DCI message.

Aspect 36: The method of any of Aspects 33-35, further comprising receiving an indication of a mapping between a set of values and a corresponding one or more sets of TCI states.

Aspect 37: The method of any of Aspects 23-36, wherein the configuration for periodic communications includes at least one of a semi-persistent scheduling configuration or a configured grant configuration.

Aspect 38: A method of wireless communication performed by a base station, comprising: transmitting a single downlink control information (DCI) message that activates multiple periodic communication configurations that include a first periodic communication configuration for full duplex periodic communications and a second periodic communication configuration for half duplex periodic communications; and activating the first periodic communication configuration and the second periodic communication configuration for a wireless communication device based at least in part on the single DCI message.

Aspect 39: The method of Aspect 38, wherein the single DCI message indicates a first set of transmission configuration indication (TCI) states for the full duplex periodic communications and a second set of TCI states for the half duplex periodic communications.

Aspect 40: The method of Aspect 39, wherein the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message.

Aspect 41: The method of Aspect 39, wherein the first set of TCI states and the second set of TCI states are indicated using a single value in the single DCI message.

Aspect 42: The method of any of Aspects 39-41, further comprising transmitting an indication of a mapping between a set of values and a corresponding one or more sets of TCI states.

Aspect 43: The method of any of Aspects 38-42, further comprising: transmitting another DCI message that deactivates the multiple periodic communication configurations; and deactivating at least one of the first periodic communication configuration or the second periodic communication configuration based at least in part on the other DCI message.

Aspect 44: The method of any of Aspects 38-43, wherein the multiple periodic communication configurations include at least one of a semi-persistent scheduling configuration or a configured grant configuration.

Aspect 45: An apparatus for wireless communication at a device, comprising a processor; memory coupled with the processor; and instructions stored in the memory and executable by the processor to cause the apparatus to perform the method of one or more of Aspects 1-15.

Aspect 46: A device for wireless communication, comprising a memory and one or more processors coupled to the memory, the one or more processors configured to perform the method of one or more of Aspects 1-15.

Aspect 47: An apparatus for wireless communication, comprising at least one means for performing the method of one or more of Aspects 1-15.

Aspect 48: A non-transitory computer-readable medium storing code for wireless communication, the code comprising instructions executable by a processor to perform the method of one or more of Aspects 1-15.

Aspect 49: A non-transitory computer-readable medium storing a set of instructions for wireless communication, the set of instructions comprising one or more instructions that, when executed by one or more processors of a device, cause the device to perform the method of one or more of Aspects 1-15.

Aspect 50: An apparatus for wireless communication at a device, comprising a processor; memory coupled with the processor; and instructions stored in the memory and executable by the processor to cause the apparatus to perform the method of one or more of Aspects 16-22.

Aspect 51: A device for wireless communication, comprising a memory and one or more processors coupled to the memory, the one or more processors configured to perform the method of one or more of Aspects 16-22.

Aspect 52: An apparatus for wireless communication, comprising at least one means for performing the method of one or more of Aspects 16-22.

Aspect 53: A non-transitory computer-readable medium storing code for wireless communication, the code comprising instructions executable by a processor to perform the method of one or more of Aspects 16-22.

Aspect 54: A non-transitory computer-readable medium storing a set of instructions for wireless communication, the set of instructions comprising one or more instructions that, when executed by one or more processors of a device, cause the device to perform the method of one or more of Aspects 16-22.

Aspect 55: An apparatus for wireless communication at a device, comprising a processor; memory coupled with the processor; and instructions stored in the memory and executable by the processor to cause the apparatus to perform the method of one or more of Aspects 23-37.

Aspect 56: A device for wireless communication, comprising a memory and one or more processors coupled to the memory, the one or more processors configured to perform the method of one or more of Aspects 23-37.

Aspect 57: An apparatus for wireless communication, comprising at least one means for performing the method of one or more of Aspects 23-37.

Aspect 58: A non-transitory computer-readable medium storing code for wireless communication, the code comprising instructions executable by a processor to perform the method of one or more of Aspects 23-37.

Aspect 59: A non-transitory computer-readable medium storing a set of instructions for wireless communication, the set of instructions comprising one or more instructions that, when executed by one or more processors of a device, cause the device to perform the method of one or more of Aspects 23-37.

Aspect 60: An apparatus for wireless communication at a device, comprising a processor; memory coupled with the processor; and instructions stored in the memory and executable by the processor to cause the apparatus to perform the method of one or more of Aspects 38-44

Aspect 61: A device for wireless communication, comprising a memory and one or more processors coupled to the memory, the one or more processors configured to perform the method of one or more of Aspects 38-44.

Aspect 62: An apparatus for wireless communication, comprising at least one means for performing the method of one or more of Aspects 38-44.

Aspect 63: A non-transitory computer-readable medium storing code for wireless communication, the code comprising instructions executable by a processor to perform the method of one or more of Aspects 38-44.

Aspect 64: A non-transitory computer-readable medium storing a set of instructions for wireless communication, the set of instructions comprising one or more instructions that, when executed by one or more processors of a device, cause the device to perform the method of one or more of Aspects 38-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
   receiving a configuration for periodic communications, wherein the configuration indicates a periodicity for the periodic communications, and wherein the configuration identifies a resource allocation for an uplink shared channel or identifies a resource allocation for a downlink shared channel;
   receiving an indication of whether at least one of full duplex resources or half duplex resources count toward the periodicity for the periodic communications; and
   communicating on the uplink shared channel or the downlink shared channel based at least in part on the configuration for periodic communications, the periodicity, and the indication.

2. The method of claim 1, wherein the indication indicates whether to count only full duplex resources or only half duplex resources toward the periodicity.

3. The method of claim 1, wherein the indication indicates whether to count only full duplex resources, only half duplex resources, or both full duplex resources and half duplex resources toward the periodicity.

4. The method of claim 1, wherein the configuration for the periodic communication comprises at least one of:
   a configuration for semi-persistent scheduling (SPS) communications, wherein the resource allocation for the downlink shared channel comprises an allocation for SPS physical downlink shared channel (PDSCH) communications; or
   a configuration for configured grant (CG) communications, wherein the resource allocation for the uplink shared channel comprises an allocation for CG physical uplink shared channel (PUSCH) communications.

5. The method of claim 1, further comprising:
   counting only full duplex resources, only half duplex resources, or both full duplex and half duplex resources toward a count associated with the periodicity based at least in part on the indication.

6. The method of claim 1, wherein the indication is received in the configuration for the periodic communications.

7. The method of claim 1, wherein the indication is received in a downlink control information (DCI) message activating the periodic communications.

8. The method of claim 1, further comprising identifying full duplex resources and half duplex resources, for interpreting the periodicity, based at least in part on:
   an indication of a slot format, or
   multiple sidelink resource pools, wherein a first sidelink resource pool includes only half duplex resources and a second sidelink resource pool includes only full duplex resources.

9. The method of claim 1, further comprising receiving a downlink control information (DCI) message activating the periodic communications, wherein the DCI message activates the periodic communications in full duplex resources or activates the periodic communications in half duplex resources.

10. The method of claim 1, further comprising receiving a downlink control information (DCI) message activating the periodic communications for the wireless communication device, wherein the DCI message comprises a single DCI message that activates the periodic communications in full duplex resources and that activates the periodic communications in half duplex resources.

11. The method of claim 10, wherein the single DCI message indicates a first set of transmission configuration indication (TCI) states for full duplex periodic communications and a second set of TCI states for half duplex periodic communications.

12. The method of claim 11, further comprising receiving an indication of a mapping between a set of values and a corresponding one or more sets of TCI states, wherein the single DCI message indicates the first set of TCI states and the second set of TCI states by includes one or more values of the set of values.

13. A method of wireless communication performed by a wireless communication device, comprising:
  receiving a single downlink control information (DCI) message that activates multiple periodic communication configurations for the wireless communication device that include a first periodic communication configuration for full duplex periodic communications and a second periodic communication configuration for half duplex periodic communications; and
  activating the first periodic communication configuration and the second periodic communication configuration based at least in part on the single DCI message.

14. The method of claim 13, wherein the single DCI message indicates a first set of transmission configuration indication (TCI) states for the full duplex periodic communications and a second set of TCI states for the half duplex periodic communications.

15. The method of claim 14, wherein the first set of TCI states is indicated using a first value, associated with a downlink reference signal and an uplink reference signal for full duplex communication, in the single DCI message, and the second set of TCI states is indicated using a second value, associated with a reference signal for half duplex communication, in the single DCI message.

16. The method of claim 14, wherein the first set of TCI states and the second set of TCI states are indicated using a single value in the single DCI message.

17. The method of claim 14, further comprising receiving an indication of a mapping between a set of values and a corresponding one or more sets of TCI states, wherein the single DCI message indicates the first set of TCI states and the second set of TCI states by includes one or more values of the set of values.

18. The method of claim 13, further comprising:
  receiving another DCI message that deactivates the multiple periodic communication configurations; and
  deactivating at least one of the first periodic communication configuration or the second periodic communication configuration based at least in part on the other DCI message.

19. A wireless communication device for wireless communication, comprising:
  memory; and
  one or more processors, coupled to the memory, configured to:
    receive a configuration for periodic communications, wherein the configuration indicates a periodicity for the periodic communications, and wherein the configuration identifies a resource allocation for an uplink shared channel or identifies a resource allocation for a downlink shared channel;
    receive an indication of whether at least one of full duplex resources or half duplex resources count toward the periodicity for the periodic communications; and
    communicate on the uplink shared channel or the downlink shared channel based at least in part on the configuration for periodic communications, the periodicity, and the indication.

20. The wireless communication device of claim 19, wherein the indication indicates whether to count only full duplex resources or only half duplex resources toward the periodicity.

21. The wireless communication device of claim 19, wherein the indication indicates whether to count only full duplex resources, only half duplex resources, or both full duplex resources and half duplex resources toward the periodicity.

22. The wireless communication device of claim 19, wherein the configuration for the periodic communication comprises at least one of:
  a configuration for semi-persistent scheduling (SPS) communications, wherein the resource allocation for the downlink shared channel comprises an allocation for SPS physical downlink shared channel (PDSCH) communications; or
  a configuration for configured grant (CG) communications, wherein the resource allocation for the uplink shared channel comprises an allocation for CG physical uplink shared channel (PUSCH) communications.

23. The wireless communication device of claim 19, wherein the one or more processors are further configured to receive a downlink control information (DCI) message activating the periodic communications, wherein the DCI message activates the periodic communications in full duplex resources or activates the periodic communications in half duplex resources.

24. The wireless communication device of claim 19, wherein the one or more processors are further configured to receive a downlink control information (DCI) message activating the periodic communications for the wireless communication device, wherein the DCI message comprises a single DCI message that activates the periodic communications in full duplex resources and that activates periodic communications in half duplex resources.

25. The wireless communication device of claim 24, wherein the single DCI message indicates a first set of transmission configuration indication (TCI) states for full duplex periodic communications and a second set of TCI states for half duplex periodic communications.

26. The wireless communication device of claim 25, wherein the one or more processors are further configured to receive an indication of a mapping between a set of values and a corresponding one or more sets of TCI states, wherein the single DCI message indicates the first set of TCI states and the second set of TCI states by includes one or more values of the set of values.

27. A wireless communication device for wireless communication, comprising:
  memory; and
  one or more processors, coupled to the memory, configured to:
    receive a single downlink control information (DCI) message that activates multiple periodic communication configurations for the wireless communication device that include a first periodic communication configuration for full duplex periodic communications and a second periodic communication configuration for half duplex periodic communications; and
    activate the first periodic communication configuration and the second periodic communication configuration based at least in part on the single DCI message.

28. The wireless communication device of claim 27, wherein the single DCI message indicates a first set of transmission configuration indication (TCI) states for the full duplex periodic communications and a second set of TCI states for the half duplex periodic communications.

29. The wireless communication device of claim 28, wherein the one or more processors are further configured to receive an indication of a mapping between a set of values and a corresponding one or more sets of TCI states, wherein the single DCI message indicates the first set of TCI states and the second set of TCI states by includes one or more values of the set of values.

30. The wireless communication device of claim 27, wherein the one or more processors are further configured to:

receive another DCI message that deactivates the multiple periodic communication configurations; and deactivate at least one of the first periodic communication configuration or the second periodic communication configuration based at least in part on the other DCI message.

\* \* \* \* \*